United States Patent
Matsuda et al.

(10) Patent No.: US 6,472,092 B1
(45) Date of Patent: Oct. 29, 2002

(54) FUEL-REFORMING APPARATUS COMPRISING A PLATE-SHAPED REFORMING CATALYST

(75) Inventors: Kazuhito Matsuda, Tochigi-ken (JP); Takahiro Tachihara, Utsunomiya (JP); Hikaru Okada, Tochigi-ken (JP); Shoji Isove, Utsunomiya (JP); Kouji Ueda, Utsunomiya (JP); Hideaki Sumi, Utsunomiya (JP); Takeshi Yamagami, Omiya (JP); Eiji Iseki, Utsunomiya (JP); Yasunori Kotani, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/372,167

(22) Filed: Aug. 11, 1999

(30) Foreign Application Priority Data

Aug. 12, 1998 (JP) ............................................ 10-228402
Aug. 12, 1998 (JP) ............................................ 10-228404
Aug. 12, 1998 (JP) ............................................ 10-228409

(51) Int. Cl.⁷ .............................................. H01M 8/06
(52) U.S. Cl. ............................ 429/17; 429/38; 429/40
(58) Field of Search ............................... 429/12, 34, 40, 429/17, 38, 39

(56) References Cited

U.S. PATENT DOCUMENTS 5,047,299 A * 9/1991 Shockling ...................... 429/20
5,413,879 A * 5/1995 Domeracki et al. ............ 429/30
5,595,833 A * 1/1997 Gardner et al. ................ 429/19
5,658,681 A * 8/1997 Sato et al. ..................... 429/13
6,165,633 A * 12/2000 Negishi ......................... 429/17

FOREIGN PATENT DOCUMENTS

| JP | 3-122001 | 5/1991 |
| JP | 7-335238 | 12/1995 |
| JP | 8-253301 | 10/1996 |
| JP | 8-293312 | 11/1996 |
| JP | 9-315801 | 12/1997 |

* cited by examiner

Primary Examiner—Patrick Ryan
Assistant Examiner—M. Wills
(74) Attorney, Agent, or Firm—Arent Fox Kintner Plotkin & Kahn, PLLC

(57) ABSTRACT

A reformer comprises first and second reforming catalyst layers arranged in a reforming chamber, and a supply mechanism for supplying reformable fuel gas, steam, and oxygen to the reforming chamber to simultaneously perform an oxidation reaction and a reforming reaction in the first and second reforming catalyst layers. Each of the first and second reforming catalyst layers is designed to have a hollow plate-shaped configuration with its surface direction perpendicular to a gas flow direction in the reforming chamber. Accordingly, a compact fuel-reforming apparatus having a good thermal efficiency is obtained, in which the start-up operation is smoothly effected.

10 Claims, 30 Drawing Sheets

F I G.15
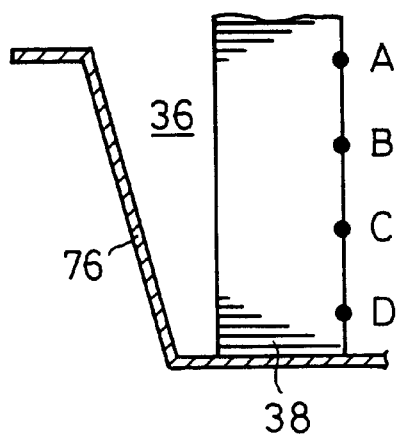
F I G.16
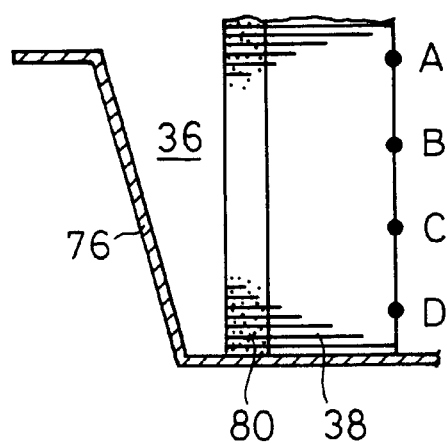

US 6,472,092 B1

FUEL-REFORMING APPARATUS COMPRISING A PLATE-SHAPED REFORMING CATALYST

BACKGROUND OF THE INVENTION

1. Field of the Invention

The present invention relates to a fuel-reforming apparatus, for producing a reformed gas containing hydrogen by reforming reformable fuel containing hydrocarbon.

2. Description of the Related Art

A fuel cell stack has been developed, which comprises, for example, a plurality of stacked fuel cells interposed by separators, the fuel cell including an anode electrode and a cathode electrode provided opposingly with a solid polymer electrolyte membrane interposed therebetween. Such a fuel cell stack has been practically used for a variety of applications.

The fuel cell stack of this type is constructed as follows. That is, a reformed gas (fuel gas) containing hydrogen, which is produced by reforming hydrocarbon, for example, an aqueous methanol solution with steam, is supplied to the anode electrode, while an oxygen-containing gas (air) is supplied to the cathode electrode. Thus, the hydrogen gas is ionized, and it flows through the solid polymer electrolyte membrane. Accordingly, the electric energy is obtained at the outside of the fuel cell.

The steam reforming reaction, in which the aqueous methanol solution is reformed to produce the reformed gas containing hydrogen as described above, is an endothermic reaction represented by $CH_3OH+H_2O \rightarrow CO_2+3H_2$. Therefore, a complicated heat transfer structure is usually incorporated in the reformer in order to supply an amount of heat necessary for the reforming reaction. As a result, the structure is complicated.

In view of the above, an endothermic reaction apparatus is known, for example, as disclosed in Japanese Laid-Open Patent Publication No. 3-122001, comprising an endothermic reaction unit including a cylindrical container for surrounding a combustion chamber having a burner disposed at one end and a reaction chamber containing a catalyst for facilitating the endothermic reaction charged along an inner cylinder of the cylindrical container, and a heat-insulating container for accommodating a plurality of endothermic reaction units as described above. In this apparatus, the reaction chamber is formed along an inner wall of an intermediate cylinder provided in the cylindrical container. The intermediate cylinder and a brim-shaped partition plate are used to form a preheating chamber for raw material gas communicating with the inlet side of the reaction chamber and a reproducing chamber communicating with the outlet side of the reaction chamber. Further, a cover is provided to form a combustion gas passage on the outer circumferential side of the preheating chamber. In this apparatus, the thermal energy of the combustion gas is effectively utilized to preheat the raw material gas so that the heat consumption amount of the combustion chamber is reduced.

However, the apparatus concerning the conventional technique described above comprises the cylindrical container provided with the inner cylinder and the outer cylinder, the intermediate cylinder arranged in the cylindrical container, and the brim-shaped partition plate provided for the intermediate cylinder. Therefore, a problem is pointed out in that the number of parts is considerably increased, and the system is complicated.

Further, the outer circumferential wall is constructed by the heat-insulating container which has a relatively large wall thickness. Therefore, a problem arises in that the whole apparatus becomes large.

In another viewpoint, for example, as disclosed in Japanese Laid-Open Patent Publication Nos. 9-315801 and 7-335238, a method is known, in which oxygen is supplied to a raw material fuel gas containing hydrocarbon to perform the oxidation reaction as the exothermic reaction, and the amount of heat released by the oxidation reaction is utilized so that the reforming reaction as the endothermic reaction is performed for the raw material fuel gas. Accordingly, an advantage is obtained in that the structure can be simplified.

In general, the velocity of the oxidation reaction is larger than the velocity of the reforming reaction. Therefore, the temperature on the inlet side of the reforming catalyst tends to increase, while the temperature on the outlet side of the reforming catalyst, which is important for the reforming reaction, tends to decrease. However, in the conventional technique described above, the reforming catalyst (composed of pellets) is formed to be lengthy in the flow direction of the gas. For this reason, the difference in temperature is large in the flow direction of the gas in the reforming catalyst. Therefore, a problem is pointed out in that it is impossible to realize the desired reforming reaction over the entire region of the catalyst layer. Further, the pellet is inconvenient in that the compact property is inferior, and it is extremely difficult to obtain an equivalent temperature over the reforming catalyst.

In the case of such a system, when it is intended to control the temperature on the gas outlet side of the reforming catalyst in order to efficiently perform the reforming reaction, it is feared that the temperature on the gas inlet side of the reforming catalyst may be locally increased to be not less than the heat resistant temperature of the reforming catalyst. For this reason, a problem is pointed out in that the concentration of produced carbon monoxide is increased, and the reforming catalyst is quickly subjected to thermal deterioration. On the other hand, when it is intended to set the temperature on the gas outlet side of the reforming catalyst in order to avoid the thermal deterioration of the reforming catalyst, an inconvenience arises in that the reaction efficiency of the reforming catalyst is extremely lowered.

A structure is usually adopted for the reforming catalyst, in which plate-shaped reforming catalyst layers and catalytic combustion chambers are alternately stacked (see, for example, Japanese Laid-Open Patent Publication No. 8-253301). However, such a reforming catalyst layer is generally designed to have a rectangular plate-shaped configuration. Therefore, the entire case for constructing the reformer is rectangular. For this reason, the following problem arises. That is, the stress tends to concentrate in the case, the case inevitably has a large wall thickness, and it is impossible to miniaturize the entire reformer.

On the other hand, when the steam reforming for the aqueous methanol solution is started, it is necessary to heat the reforming catalyst to a predetermined temperature. For this purpose, an apparatus, which is disposed at the outside of the reformer, is usually used to supply the heat such as steam to the reformer. However, a compact reformer especially having a high efficiency is required for the fuel cell stack to be carried on vehicles or automobiles. In such a case, it is impossible to adopt the structure as described above.

As shown in FIG. 34, the reformer 1 for reforming the aqueous methanol solution is sometimes designed such that the cross-sectional area of a flow passage 2 for methanol mixed with steam (hereinafter referred to as "reformable fuel gas") is smaller than the cross-sectional area of the reforming catalyst section 4. In this arrangement, in order to uniformly supply the reformable fuel gas to the entire surface of the reforming catalyst section 4, there is usually provided a region for widening the cross-sectional area of the flow passage, i.e., the cone section 6 on the upstream side of the reforming catalyst section 4.

However, if the cone section 6 is not designed to be sufficiently long in the flow direction of the reformable fuel gas, the reformable fuel gas is not delivered uniformly over the entire cross-sectional area of the reforming catalyst section 4. As a result, the reformable fuel gas flows through only a part of the reforming catalyst section 4. It is feared that the whole surface of the reforming catalyst section 4 cannot be utilized effectively. Therefore, in fact, it is necessary to use a sufficiently long cone section 6. A problem is pointed out in that the reformer 1 has a considerably large size.

On the other hand, the introducing hole for supplying the reformable fuel gas to the flow passage 2 of the reformer 1 is usually provided at one place. However, considering the property of the fuel cell stack that it is carried on the vehicle, it is desirable that the reformer 1 is of the transverse or horizontal type as shown in FIG. 34 so that the reformable fuel gas is allowed to flow in the lateral or horizontal direction. On the contrary, if the introducing hole is provided at one place, a problem arises in that it is extremely difficult to uniformly supply the reformable fuel gas to the whole of the reforming catalyst section 4, due to the influence of the self-weight of the reformable fuel gas.

In the case of the fuel-reforming apparatus for producing the reformed gas by reforming the aqueous methanol solution, carbon monoxide (CO) and unreacted hydrocarbon components exist in a mixed manner in the reformed gas components produced during the warming-up process after the start-up. If the reformed gas mixed with CO is supplied to the fuel cell stack, the CO poisoning of the catalyst occurs on the anode electrode.

In order to dissolve the inconvenience described above, a fuel cell system is known as disclosed, for example, in Japanese Laid-Open Patent Publication No. 8-293312. In this conventional technique, when the fuel cell is in the start-up operation, if any one of the detected temperature and the detected CO concentration which are obtained by a temperature sensor and a CO sensor respectively is deviated from an allowable temperature range or an allowable CO concentration which is prescribed on condition that the fuel cell is in the steady state, then a flow passage-switching valve is used to switch the supply destination of the hydrogen-rich gas supplied from the reforming unit, from the fuel cell to a burner so that the hydrogen-rich gas containing high concentration CO is not supplied to the fuel cell.

However, in the conventional technique described above, methanol and water are supplied into the reforming unit, and the reformed gas containing hydrogen gas is produced by reforming methanol with steam. The steam reforming reaction is an endothermic reaction. The reforming unit is provided with a burner for heating the reforming unit to a temperature appropriate to perform the reforming reaction of methanol. However, the following problem is pointed. That is, a considerably long period of time is required for the warming-up operation to heat the reforming unit up to the temperature appropriate to perform the reforming reaction, because the reforming unit is heated to the predetermined temperature (for example, about 250° C. to 300° C.) by using the burner.

SUMMARY OF THE INVENTION

A general object of the present invention is to provide a fuel-reforming apparatus composed of a simple system which makes it possible to smoothly perform a desired reforming reaction and easily miniaturize the entire apparatus.

A principal object of the present invention is to provide a compact fuel-reforming apparatus having a good thermal efficiency in which the start-up operation is smoothly performed.

Another principal object of the present invention is to provide a fuel-reforming apparatus and a method for controlling the same which make it possible to reliably avoid the occurrence of thermal deterioration of a reforming catalyst section and smoothly perform a desired reforming reaction.

Still another principal object of the present invention is to provide a fuel-reforming apparatus composed of a simple system which has an effective heat-insulating function and which can be produced economically.

Still another principal object of the present invention is to provide a fuel-reforming apparatus and a method for controlling the same which make it possible to greatly shorten the warming-up operation time by using a simple system.

Still another principal object of the present invention is to provide a fuel-reforming apparatus and a method for controlling the same which make it possible to perform the warming-up operation efficiently and economically.

Still another principal object of the present invention is to provide a fuel-reforming apparatus and a method for controlling the same which make it possible to reliably detect the reaction state in a reforming catalyst section by using a simple and inexpensive system.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 15 illustrates a reforming catalyst layer which uses no flow-regulating plate;

FIG. 16 illustrates a reforming catalyst layer which uses a flow-regulating plate;

DESCRIPTION OF THE PREFERRED EMBODIMENTS

Figure 1:
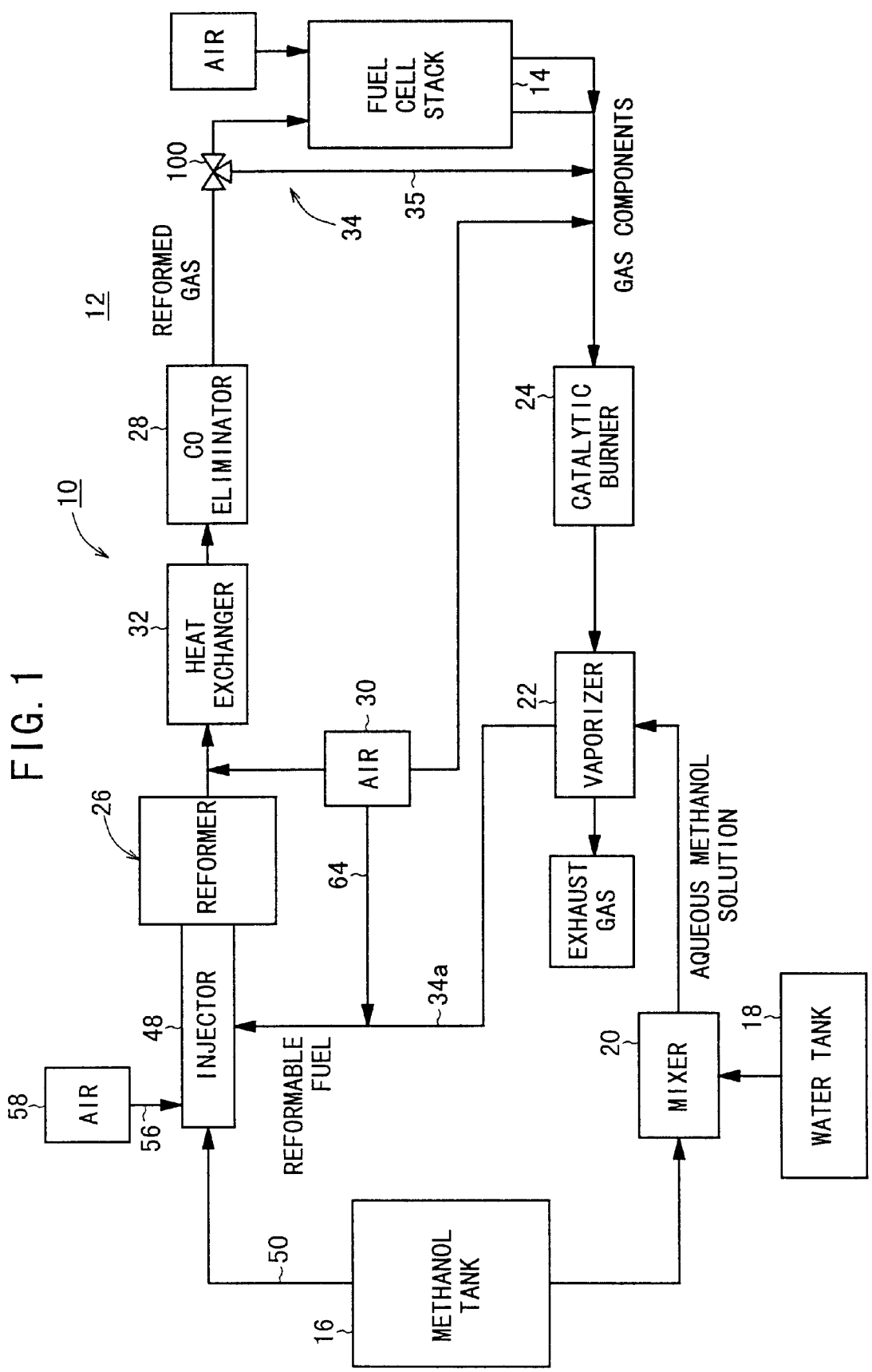
FIG. 1 shows a schematic arrangement illustrating a fuel cell system for incorporating a fuel-reforming apparatus according to a first embodiment of the present invention.

FIG. 1 shows a schematic arrangement illustrating a fuel cell system 12 for incorporating a fuel-reforming apparatus 10 according to the first embodiment of the present invention. The fuel cell system 12 comprises a fuel-reforming apparatus 10 according to the first embodiment which produces hydrogen gas by reforming reformable fuel containing hydrocarbon, and a fuel cell stack 14 to which reformed gas is supplied from the fuel-reforming apparatus 10 and air is supplied as oxygen-containing gas, for effecting the power generation by using the hydrogen gas contained in the reformed gas and the oxygen contained in the air. Those usable as the hydrocarbon include, for example, methanol, natural gas, and methane.

The fuel-reforming apparatus 10 includes a methanol tank 16 for storing hydrocarbon, for example, methanol, a water tank 18 for storing, for example, produced water discharged from the fuel cell system 12, a mixer 20 for being supplied with predetermined amounts of methanol and water from the methanol tank 16 and the water tank 18 respectively to mix an aqueous methanol solution, a vaporizer 22 for vaporizing the aqueous methanol solution supplied from the mixer 20, a catalytic burner 24 for supplying the heat of vaporization to the vaporizer 22, a reformer 26 for reforming methanol mixed with stream introduced from the vaporizer 22 (hereinafter referred to as "reformable fuel") to produce the reformed gas containing hydrogen gas, and a CO eliminator 28 for removing carbon monoxide contained in the reformed gas discharged from the reformer 26.

Air is supplied from an air feeder 30 to the catalytic burner 24 and the CO eliminator 28 respectively. A heat exchanger 32 for lowering the temperature of the reformed gas is arranged between the reformer 26 and the CO eliminator 28. The vaporizer 22, the reformer 26, the heat exchanger 32, the CO eliminator 28, and the catalytic burner 24 are connected with each other via a tube 34, and they form a circulating flow passage via a bypass flow passage 35 (see FIG. 2).

Figure 3:
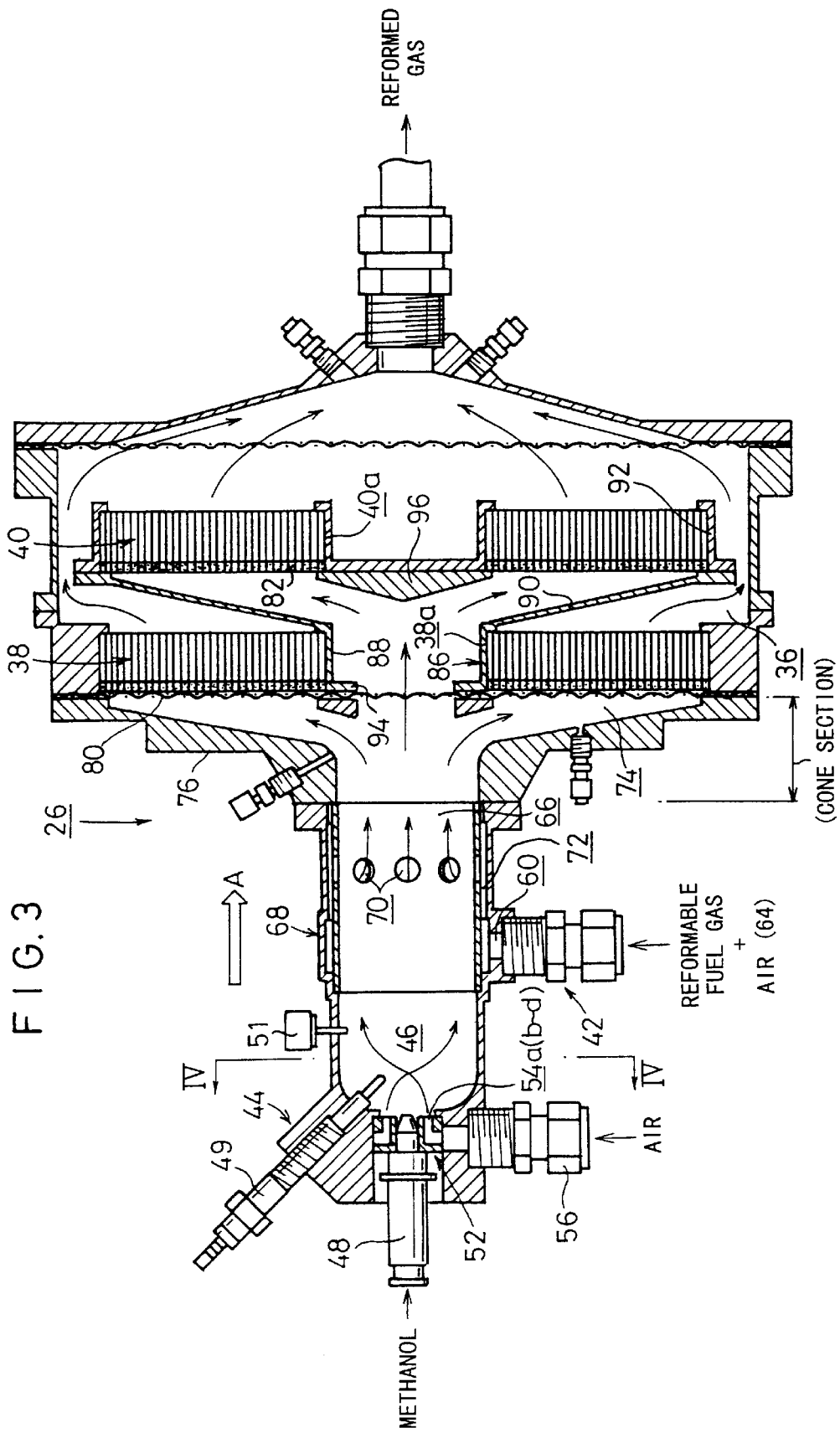
FIG. 3 shows a longitudinal sectional view illustrating a reformer for constructing the fuel-reforming apparatus.

As shown in FIG. 3, the reformer 26 has a horizontal structure, comprising first and second reforming catalyst layers (reforming catalyst sections) 38, 40 arranged in a reforming chamber 36, a supply mechanism 42 for supplying the aqueous methanol solution, the steam, and the oxygen-containing gas, for example, air to the reforming chamber 36 to simultaneously perform the oxidation reaction and the reforming reaction in the first and second reforming catalyst layers 38, 40, and a start-up combustion mechanism 44 arranged on the upstream side of the first and second reforming catalyst layers 38, 40, for directly supplying the heating combustion gas to the first and second reforming catalyst layers 38, 40 upon the start-up. The so-called autothermal system, in which the oxidation reaction and the fuel-reforming reaction are simultaneously performed in the first and second reforming catalyst layers 38, 40, specifically refers to a system in which $CH_3OH + 3/2 O_2 \rightarrow CO_2 + 2H_2O$ (exothermic reaction) and $CH_3OH + H_2O \rightarrow CO_2 + 3H_2$ (endothermic reaction) are simultaneously performed.

Figure 2:
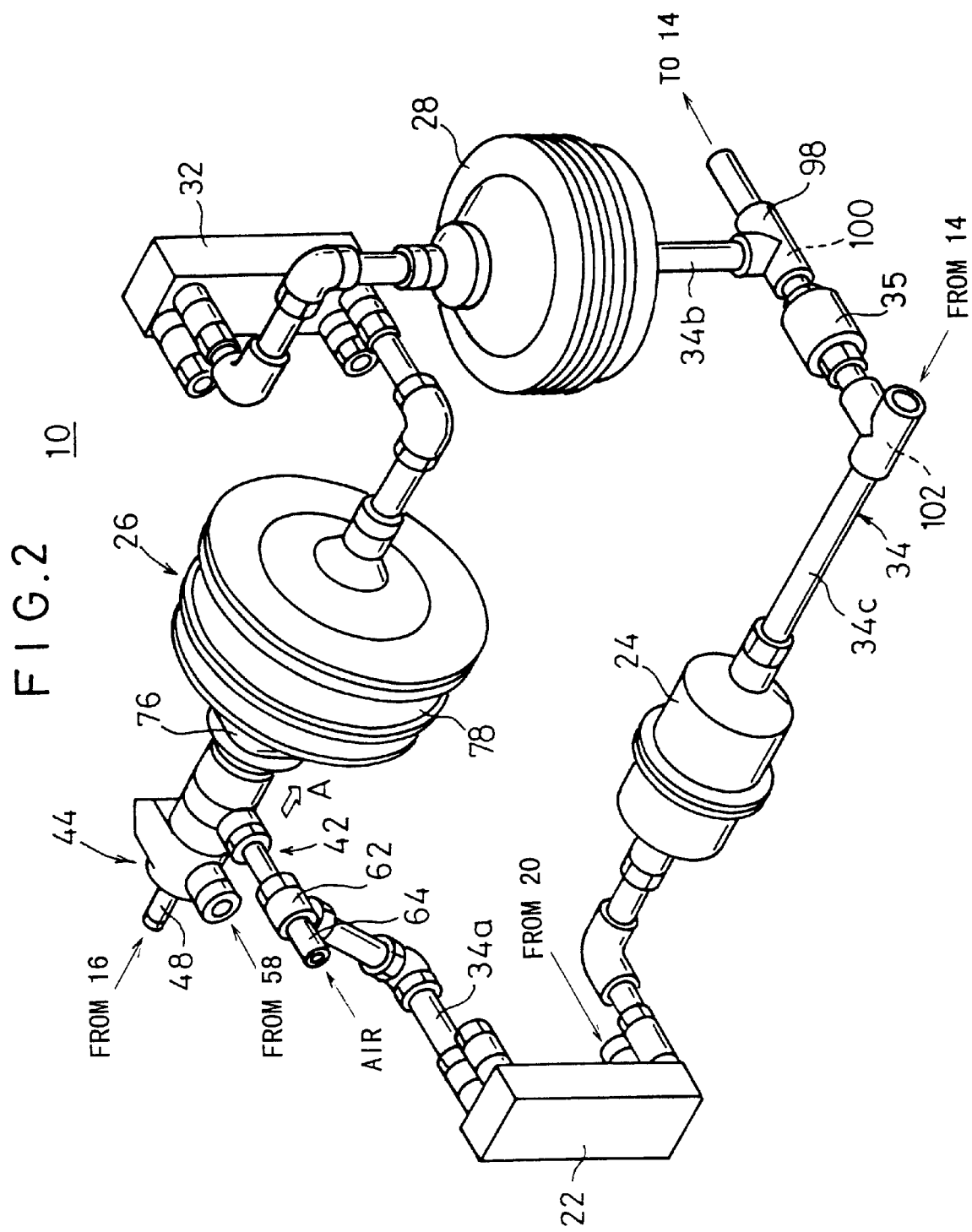
FIG. 2 shows a perspective view illustrating the fuel-reforming apparatus.

As shown in FIGS. 2 and 3, the combustion mechanism 44 is provided for the reformer 26 corresponding to the upstream side of the gas flow direction (direction indicated by the arrow A) such that the combustion mechanism 44 is concentric with the first and second reforming catalyst layers 38, 40. The combustion mechanism 44 comprises an injector (fuel injection means) 48 for supplying fuel, for example, methanol to a combustion chamber 46, an ignition plug, for example, a glow plug 49, and a temperature sensor (or pressure sensor) 51 for detecting the temperature (or pressure) in the combustion chamber 46. The injector 48 is connected via a fuel passage 50 to the methanol tank 16 (see FIG. 1).

Figure 4:
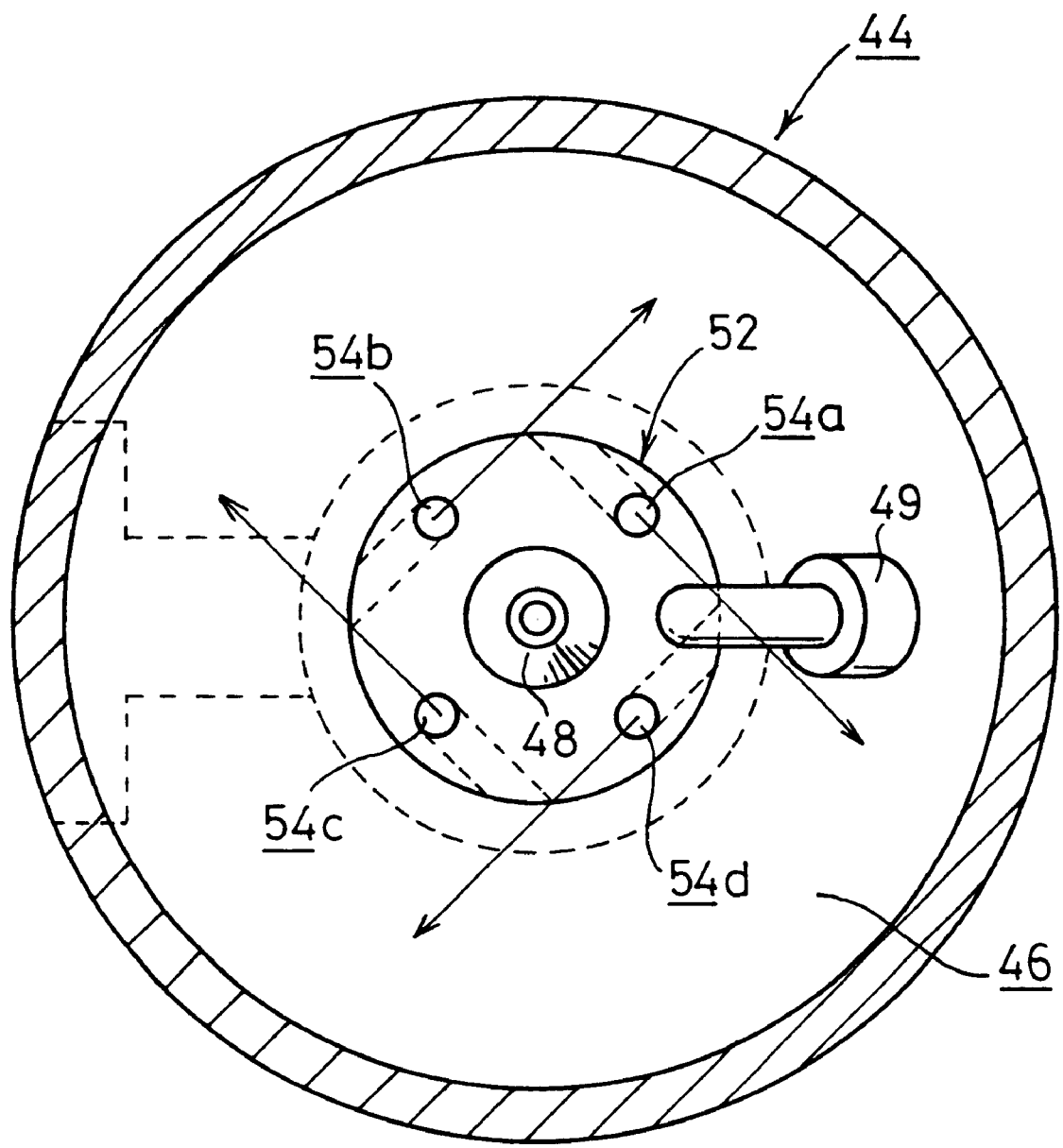
FIG. 4 shows a sectional view taken along a line IV—IV shown in FIG. 3.

As shown in FIG. 3, an air nozzle 52 is installed to the circumference on the forward end side of the injector 48. The air nozzle 52 is provided with four air discharge ports 54a to 54d which are open toward the combustion chamber 46. As shown in FIG. 4, the respective air discharge ports 54a to 54d are set for their injection directions and angles so-that the vortex flow is generated in the combustion chamber 46. The air nozzle 52 is connected via a first air passage 56 to an air feeder 58 or the air feeder 30 (see FIG. 1).

As shown in FIGS. 2 and 3, the supply mechanism 42 is arranged on the downstream side of the combustion mechanism 44, and it is provided with a supply port 60 which is disposed on the downstream side of the injector 48 and on the upstream side of the first reforming catalyst layer 38, for being supplied with the fuel gas composed of the reformable fuel and the steam and the air for oxidation and dilution independently or in a mixed manner. The supply port 60 is connected to the vaporizer 22 via the passage 34a. A joint section 62, which is provided at an intermediate position of the passage 34a, communicates, for example, with the air feeder 30 via a second air passage 64 (see FIG. 1).

The reformer 26 includes a flow passage chamber (dilution chamber) 66 which communicates with the reforming chamber 36 and which has a cross-sectional area smaller than that of the reforming chamber 36. A plurality of introducing holes 70 for introducing the reformable fuel and the air (at least the reformable fuel) into the flow passage chamber 66, are arranged in the circumferential direction on the wall 68 of the flow passage chamber 66. The wall 68 has a double wall structure including a chamber (opening) 72 at the inside. The supply port 60 is provided on the outer wall thereof. The plurality of introducing holes 70 communicating with the chamber 72 are provided on the inner wall thereof.

Each of the introducing holes 70 is set for the discharge angle and/or the hole diameter in order to uniformly supply the reformable fuel and the air (hereinafter simply referred to as "reformable fuel") to the first and second reforming catalyst layers 38, 40. The opening cross-sectional area of the entire introducing holes 70 is set to have a value which is considerably smaller than that of the cross-sectional area of the first reforming catalyst layer 38.

The reformer 26 is provided with a diffuser section (flow passage member) 76 for forming a gas supply passage 74 having a conical configuration with its diameter suddenly increasing toward the first reforming catalyst layer 38 from the flow passage chamber 66 communicating with the combustion chamber 46. A substantially cylindrical case 78 is fastened by screws to the end of the diffuser section 76 with the increasing diameter. The first and second reforming catalyst layers 38, 40 are installed in the case 78.

Each of the first and second reforming catalyst layers 38, 40 is composed of a catalyst based on copper or copperozinc, and it is designed to have a honeycomb structure with a hollow plate shape. The honeycomb structure has a better thermal conductivity than the pellet-shaped catalyst, and it is effective to decrease the peak temperature. The mesh of each honeycomb is set to be 300 to 800 cells/IN$^2$. The surface direction of each honeycomb is aligned perpendicularly to the gas flow direction (direction of the arrow A) in the reforming chamber 36.

First and second flow-regulating plates 80, 82 are fixed on the upstream side in the gas flow direction of the first and second reforming catalyst layers 38, 40. The first and second flow-regulating plates 80, 82 function to allow the reformable fuel fed from the flow passage chamber 66 to flow at a uniform flow rate through the entire surfaces of the first and second reforming catalyst layers 38, 40, an d they are composed of, for example, foam metal, honeycomb material, sintered metal, punching metal, or porous metal having ventilation performance. Each of the first and second flow-regulating plates 80, 82 is designed to have a different flow-regulating function (pressure loss) depending on the flow state of the reformable fuel, i.e., depending on whether or not the reformable fuel flows with ease or with difficulty. When the reformable fuel flows with difficulty, for example, the flow-regulating plate 80, 82 is designed to have a thin wall thickness, or a coarse structure is adopted so that the reformable fuel flows with ease. On the other hand, when the reformable fuel flows with ease, for example, the flow-regulating plate 80, 82 is designed to have a thick wall thickness, or a fine structure is adopted so that the reformable fuel flows with difficulty. Accordingly, it is possible to obtain a uniform gas flow rate to the first and second reforming catalyst layers 38, 40.

Figure 5:
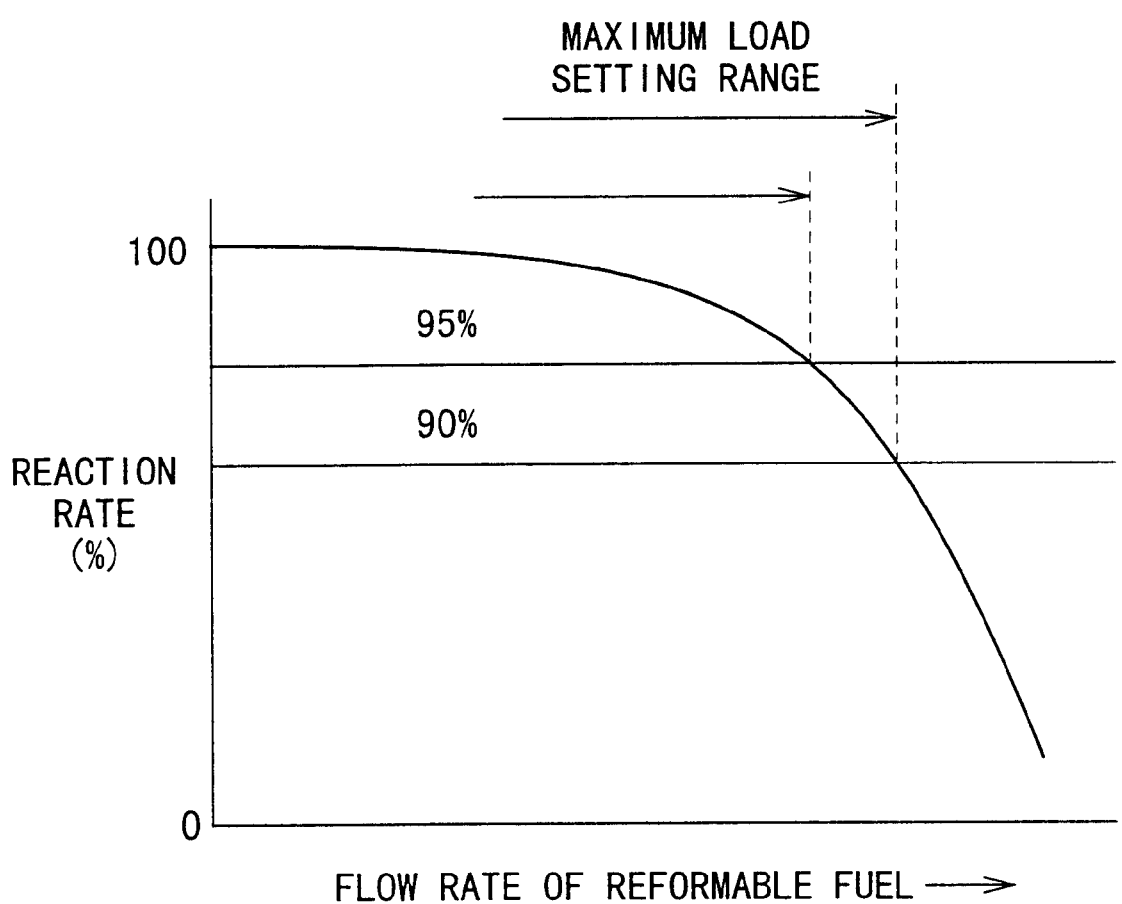
FIG. 5 illustrates the relationship between the reaction rate and the flow rate of the reformable fuel.

The first and second reforming catalyst layers 38, 40 have the characteristic as shown in FIG. 5 with respect to the load (flow rate of the reformable fuel). That is, if the flow rate per unit time of the reformable fuel supplied to the first and second reforming catalyst layers 38, 40 is small, the time for the reformable fuel retained in the first and second reforming catalyst layers 38, 40 is prolonged. Therefore, the reforming reaction of the reformable fuel proceeds sufficiently to increase the rate (i.e., the reaction rate) to cause any of the reactions of $CH_3OH \rightarrow CO+2H_2$, $CH_3OH+H_2O \rightarrow CO_2+3H_2$ (endothermic reaction) and $CH_3OH+3/2O_2 \rightarrow CO_2+2H_2O$ (exothermic reaction). On the other hand, if the flow rate per unit time of the reformable fuel is increased, the time for the reformable fuel retained in the first and second reforming catalyst layers 38, 40 is shortened, resulting in the increase in rate of the reformable fuel passing therethrough in an unreacted state. Therefore, if the flow rate of the reformable fuel is increased, the reaction rate of the reformable fuel is decreased.

If the reaction rate of the reformable fuel is not more than 90%, unreacted methanol remains in a large amount. If the unreacted methanol is directly supplied to the fuel cell, the power generation performance of the fuel cell is lowered, which is not preferred. For this reason, for example, a transformer for processing the unreacted methanol is provided at the downstream stage of the reformer 26 in some cases. However, this arrangement increases the constitutive components of the system, resulting in the increase in volume and weight, which is not preferred. Therefore, the maximum load is set so that the reaction rate for the first and second reforming catalyst layers 38, 40 is not less than 90%, more preferably not less than 95%.

Figure 6:
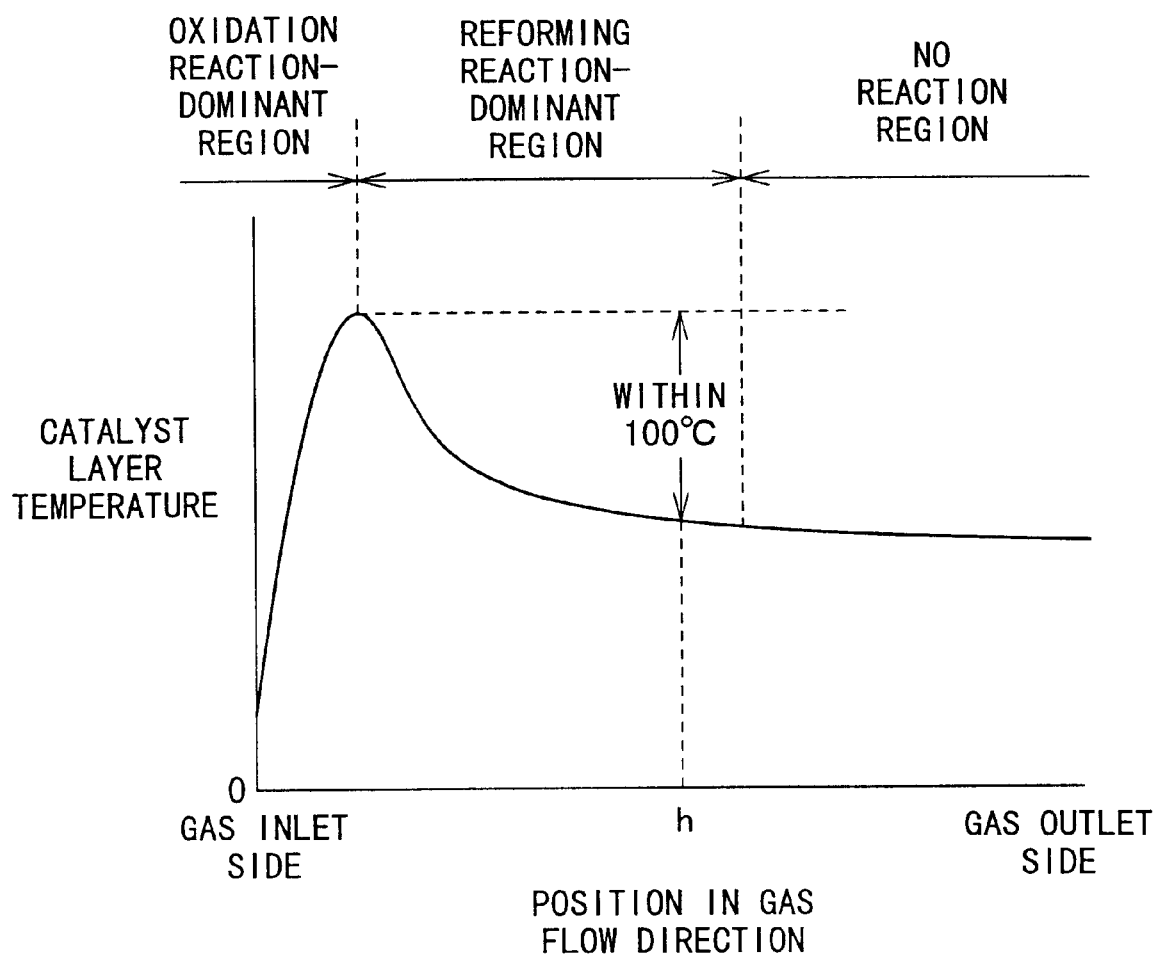
FIG. 6 illustrates the relationship between the position of the reforming catalyst layer in the thickness direction and the temperature of the catalyst layer.

On the other hand, the fuel-reforming apparatus 10 adopts the autothermal system. The oxidation reaction and the reforming reaction coexist in the first and second reforming catalyst layers 38, 40. Therefore, as shown in FIG. 6, the following temperature distribution exists. That is, the temperature is quickly increased from the gas inlet side to the gas outlet side concerning the position in the gas flow direction (thickness direction) of the first and second reforming catalyst layers 38, 40. After arrival at the peak temperature, the temperature is gently lowered. This is because of the following reason. That is, the reaction velocity of the oxidation reaction is faster than that of the reforming reaction in the first and second reforming catalyst layers 38, 40. The temperature is rapidly increased on the gas inlet side due to the heat generation caused by the oxidation reaction. The reforming reaction, which is the endothermic reaction, occurs thereafter.

In such a circumstance, it is conceived that the difference between the peak temperature and the gas inlet/outlet temperature is decreased by lowering the reaction rate. However, the problem arises as described above in that a large amount of unreacted methanol remains when the reaction rate is lowered. On the other hand, in order to allow the difference between the peak temperature and the gas inlet/outlet temperature to be within a predetermined range while maintaining the state of the high reaction rate, it is necessary to set the thickness of the first and second reforming catalyst layers 38, 40 to be appropriate.

Accordingly, in the first embodiment, each of the first and second reforming catalyst layers 38, 40 is set to have the thickness "h" corresponding to the position at which the difference between the peak temperature and the gas outlet temperature at the inside is within 100 ° C., more preferably within 50° C., i.e., the position in the gas flow direction as shown in FIG. 6.

Figure 7:
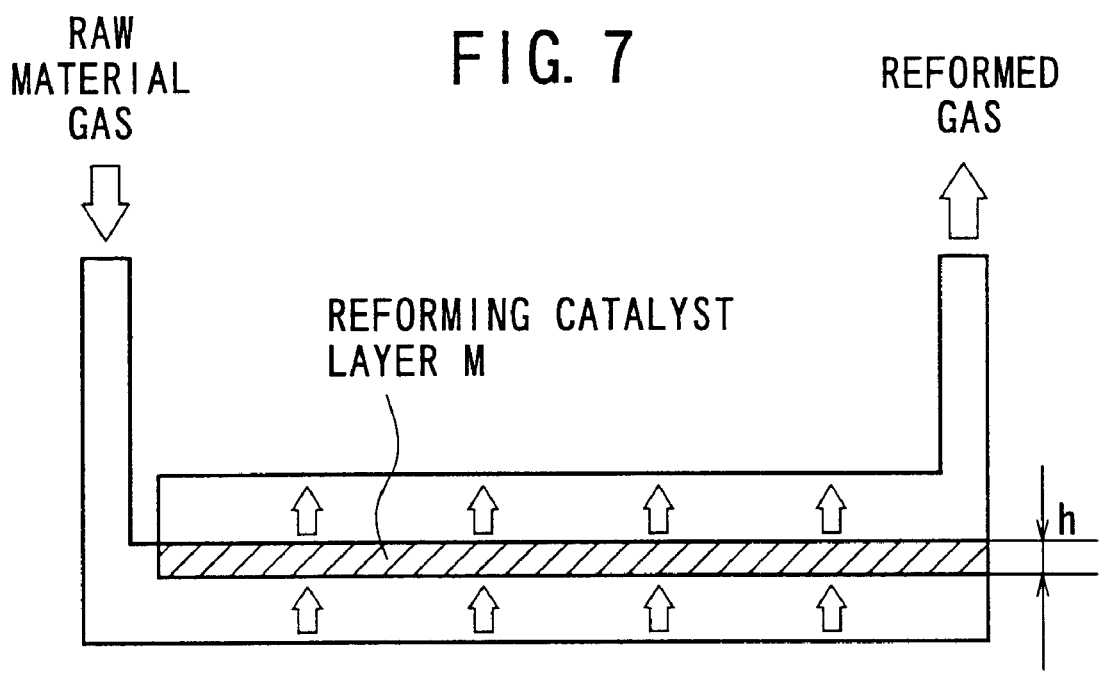
FIG. 7 illustrates an experimental result for detecting the change in methanol reaction rate depending on the difference in thickness of the reforming catalyst layer.
Figure 8:
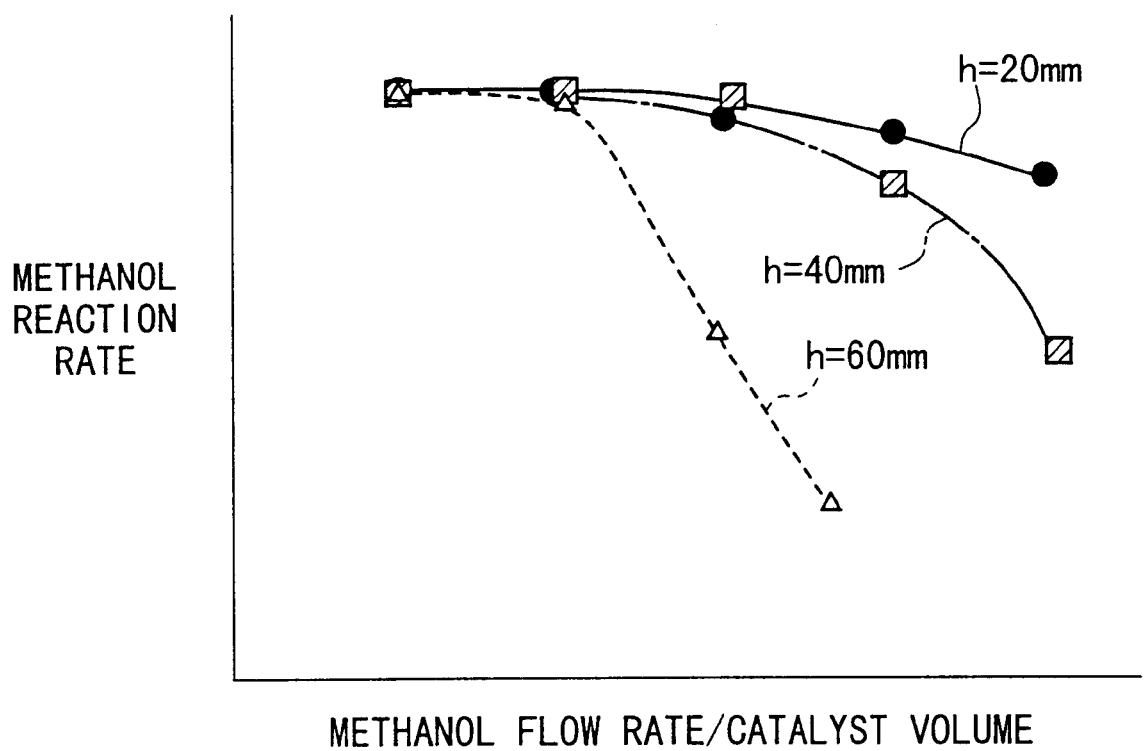
FIG. 8 shows the change in methanol reaction rate obtained by the experiment.

As shown in FIG. 7, it is assumed that the raw material gas (fuel gas) is introduced into the reforming catalyst layer M to produce the reformed gas. When the peak temperature of the reforming catalyst layer M is made constant, if the thickness "h" of the reforming catalyst layer M is changed, then the change in methanol reaction rate appears as shown in FIG. 8. Therefore, the thinner the thickness "h" of the reforming catalyst layer M is, the higher the methanol reaction rate is, and hence the performance is improved. In the first embodiment, the thickness "h" of the first and second reforming catalyst layers 38, 40 is set to be within a range of 5 mm to 40 mm, more preferably within a range of 10 mm to 30 mm. The outer diameter is set to be about 150 mm to 250 mm.

As shown in FIG. 3, a gas flow passage-forming means 86 is arranged between the first and second reforming catalyst layers 38, 40 so that the reformable fuel gas passes through any one of the first and second reforming catalyst layers 38, 40. The gas flow passage-forming means 86 is composed of, for example, a plate member made of SUS, including a cylindrical section 88 to be inserted into the central hollow portion 38a of the first reforming catalyst layer 38, a conical section 90 with its diameter increasing along the gas flow direction from the end of the cylindrical section 88, and a ring section 92 provided integrally at the end of the conical section 90, for covering the outer circumference of the second reforming catalyst layer 40.

A throttle-shaped section 94 is integrally formed at the forward end of the cylindrical section 88, which has its diameter decreasing in the direction opposite to the gas flow direction. The distribution state of the gas flowing into the first and second reforming catalyst layers 38, 40 can be adjusted by appropriately selecting the shape of the throttle-shaped section 94. A conical cover member 96 is installed to the central hollow portion 40a of the second reforming catalyst layer 40.

As shown in FIG. 2, a three-way valve 100 is provided at a joint section 98 for the passages 34b, 34c which constitute the tube 34 and which are connected to the catalytic burner 24 and the CO eliminator 28 respectively. The three-way valve 100 is switchable between the position for making communication for the passage 34b and the fuel cell stack 14 and the position for making communication for the passage 34b and the passage 34c via the bypass flow passage 35. The passage 34c is arranged with an introducing port 102 for introducing the gas such as unreacted hydrogen gas contained in the discharge components discharged from the fuel cell stack 14.

Figure 9:
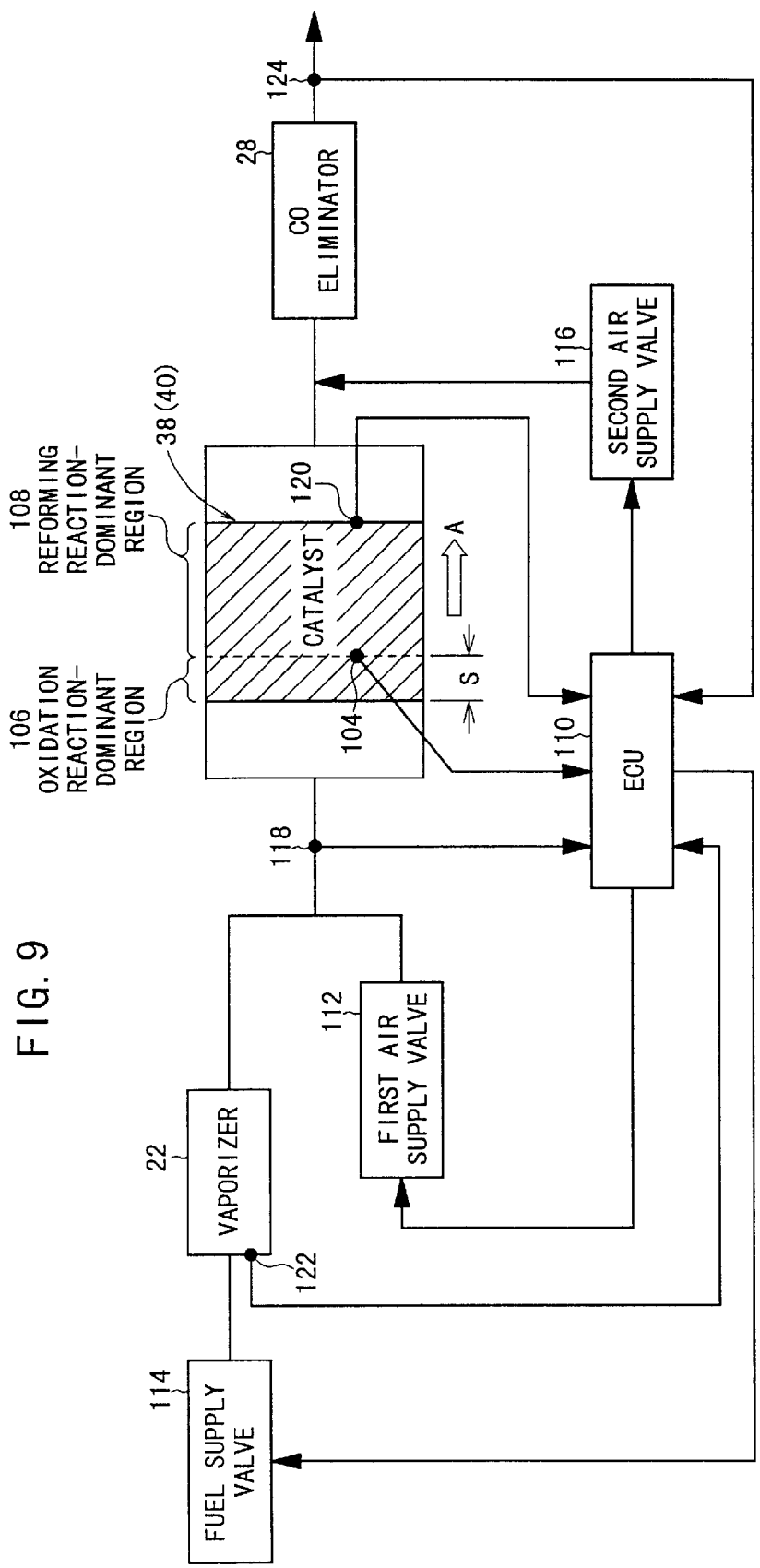
FIG. 9 illustrates ECU and a temperature sensor installed in the reformer.

As shown in FIG. 9, a first temperature sensor (temperature-detecting means) 104 for detecting the peak temperature of the first and second catalyst layers 38, 40 is arranged in the first and second reforming catalyst layers 38, 40. Each of the first and second reforming catalyst layers 38, 40 has the temperature distribution along the gas flow direction (direction of the arrow A). The portion corresponding to the oxidation reaction-dominant region 106 exists from the gas inlet side. The portion corresponding to the reforming reaction-dominant region 108 exists from the terminal end side of the oxidation reaction-dominant region 106 to the gas outlet side.

The peak temperature appears at the boundary site between the oxidation reaction-dominant region 106 and the reforming reaction-dominant region 108. The first temperature sensor 104 is disposed at the peak temperature position which is separated inwardly by a distance S from the surface on the gas inlet side. The distance S is set to give the position within ¼ of the thickness "h" of the first and second reforming catalyst layers 38, 40, specifically at the position of about 1 mm to 5 mm when the thickness "h" is 20 mm. The peak temperature of the first and second reforming catalyst layers 38, 40 is subjected to positional dispersion depending on the in-plane temperature distribution of the first and second reforming catalyst layers 38, 40. Therefore, it is preferable that the first temperature sensor 104 is installed at a plurality of positions.

The first temperature sensor 104 is connected to ECU (Electronic Control Unit) 110 which serves as a control means. ECU 110 controls a first air supply valve 112 for feeding the air to the reformable fuel discharged from the vaporizer 22.

A fuel supply valve 114 for supplying a predetermined amount of aqueous methanol solution is connected to the vaporizer 22. A second air supply valve 116 for supplying the air to selectively oxidize CO is connected to the CO eliminator 28. The fuel supply valve 114 and the second air supply valve 116 are controlled by ECU 110. Specifically, the CO concentration is detected on the basis of the outlet temperature of the reformer 26. Accordingly, the amount of produced CO is detected on the basis of the amount of supplied fuel and the concentration of CO. Therefore, the second air supply valve 116 is controlled so that the air is supplied in an amount to satisfy $CO+1/2O_2 \rightarrow CO_2$.

A second temperature sensor 118 is arranged in the flow passage chamber 66. A third temperature sensor 120 for detecting the outlet temperature of the reformed gas is provided at the end on the downstream side (reformed gas outlet side) of the first and second reforming catalyst layers 38, 40 in the reforming chamber 38. The first to third temperature sensors 104, 118, 120 input the detected temperatures to ECU 110 respectively. Those connected to ECU 110 include a fourth temperature sensor 122 for detecting the temperature of the vaporizer 22, and a CO sensor 124 for detecting the CO concentration in the reformed gas discharged from the CO eliminator 28.

Figure 10:
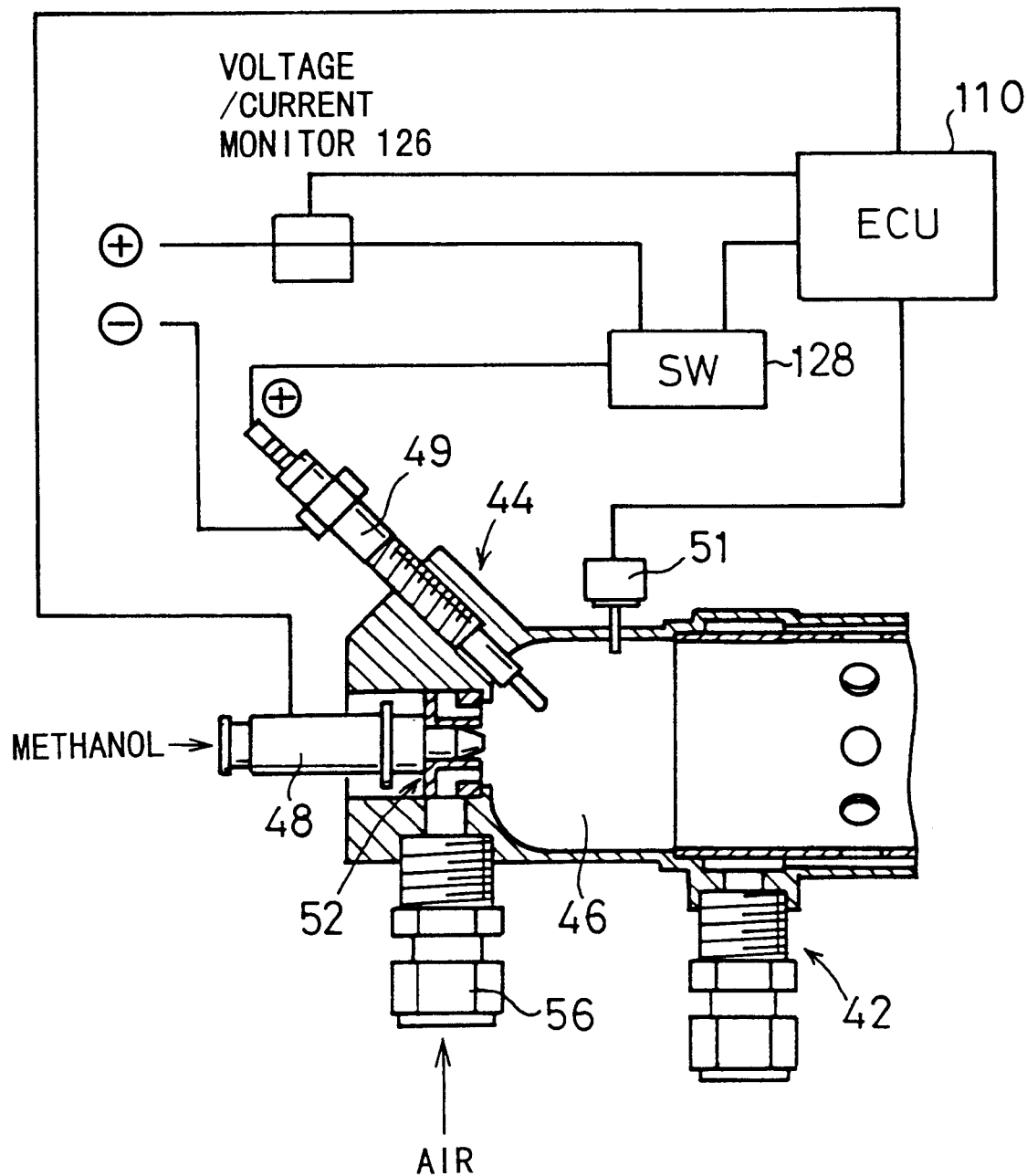
FIG. 10 illustrates a combustion mechanism connected to the reformer.

As shown in FIG. 10, a voltage/current monitor (detecting means) 126 for detecting the voltage value and/or the current value applied to the glow plug 49 is connected to ECU 110 for controlling the fuel cell system 12. A switch 128 for turning ON/OFF the electric power application to the glow plug 49 is connected to ECU 110.

Figure 11:
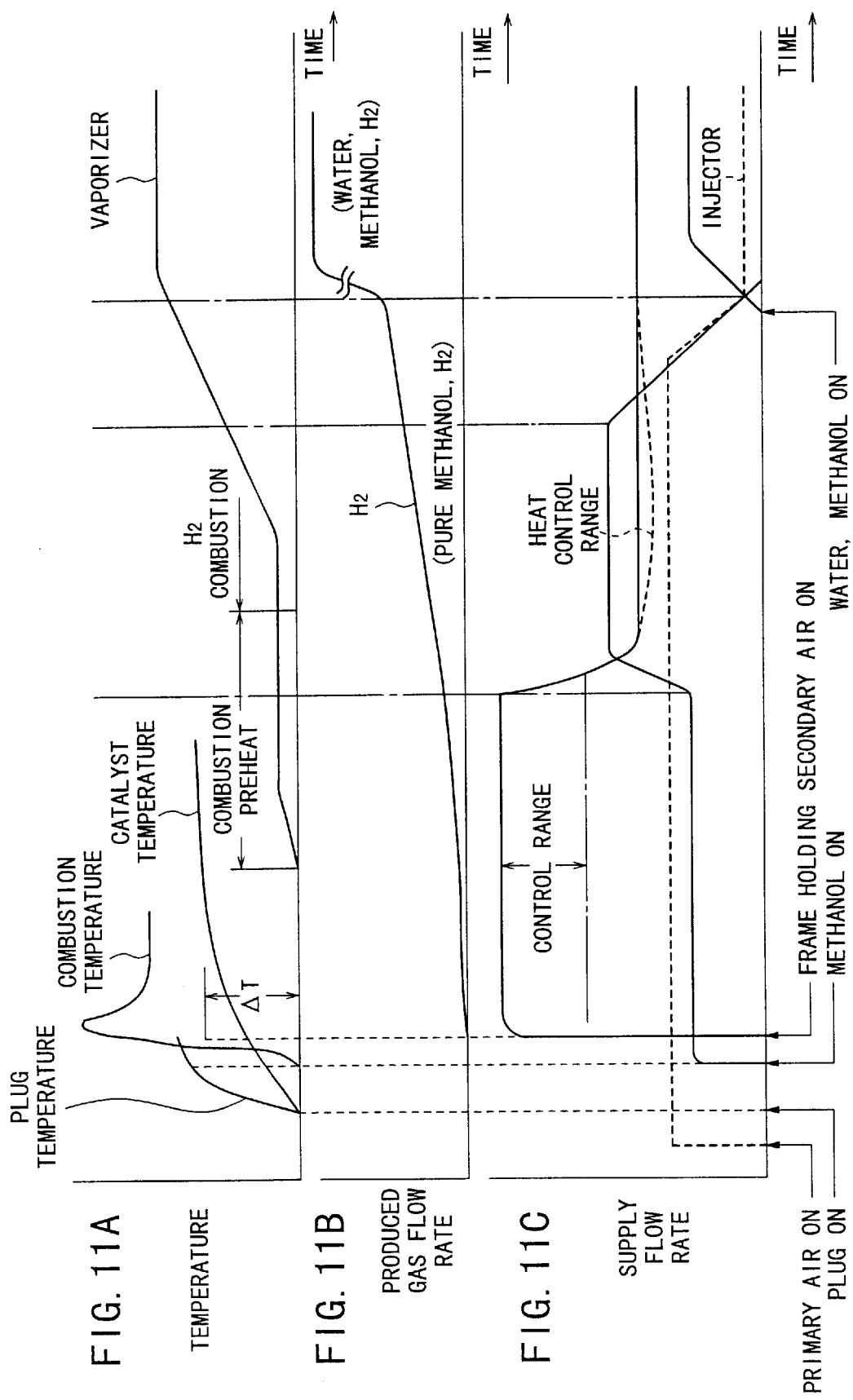
FIGS. 11A to 11C show timing charts illustrating a control method according to the first embodiment.
Figure 12:
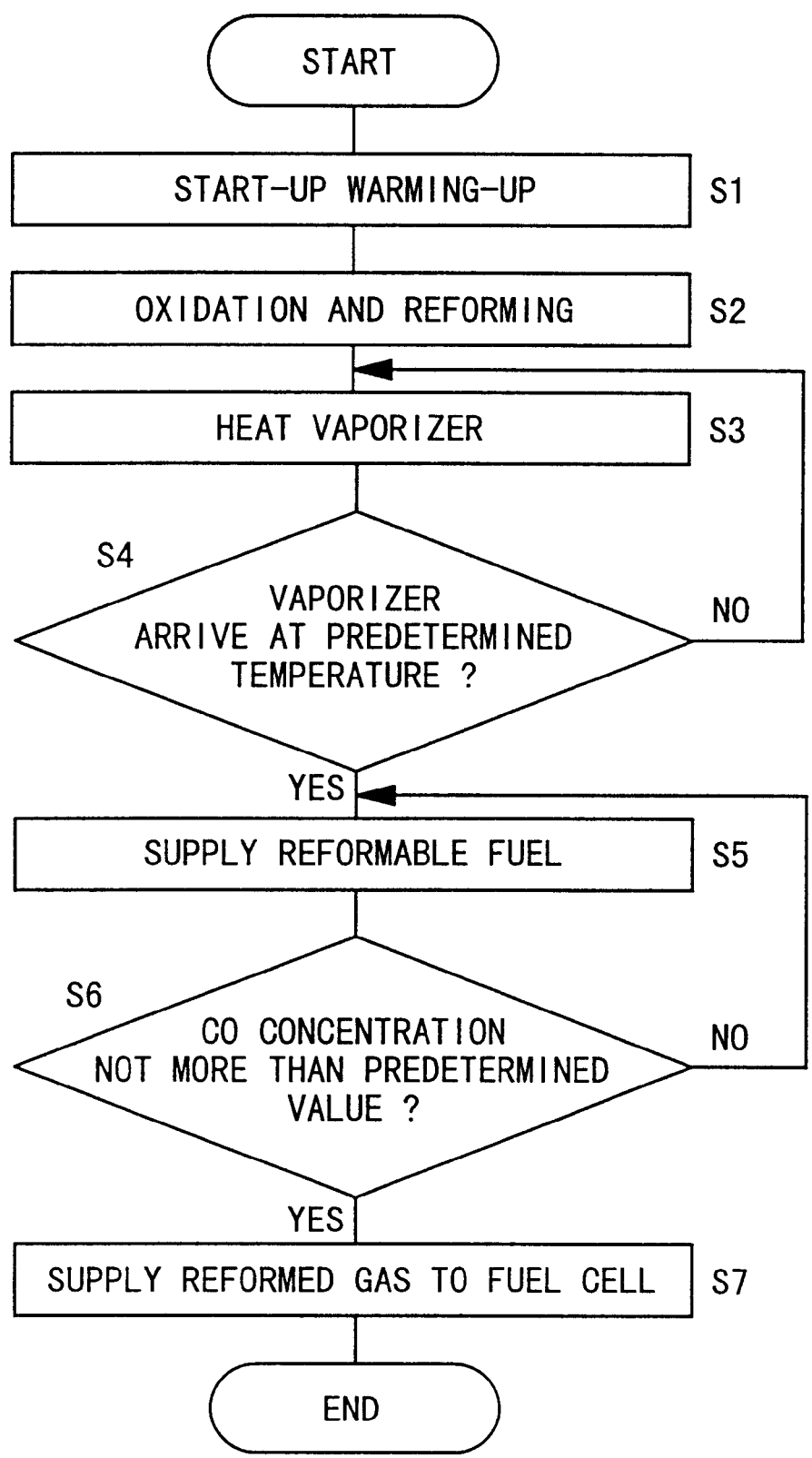
FIG. 12 shows a flow chart illustrating the control method according to the first embodiment.

The operation of the fuel-reforming apparatus 10 constructed as described above will be explained below on the basis of a time chart shown in FIG. 11A to FIG. 11C and a flow chart shown in FIG. 12 in relation to the control method according to the first embodiment of the present invention.

Figure 13:
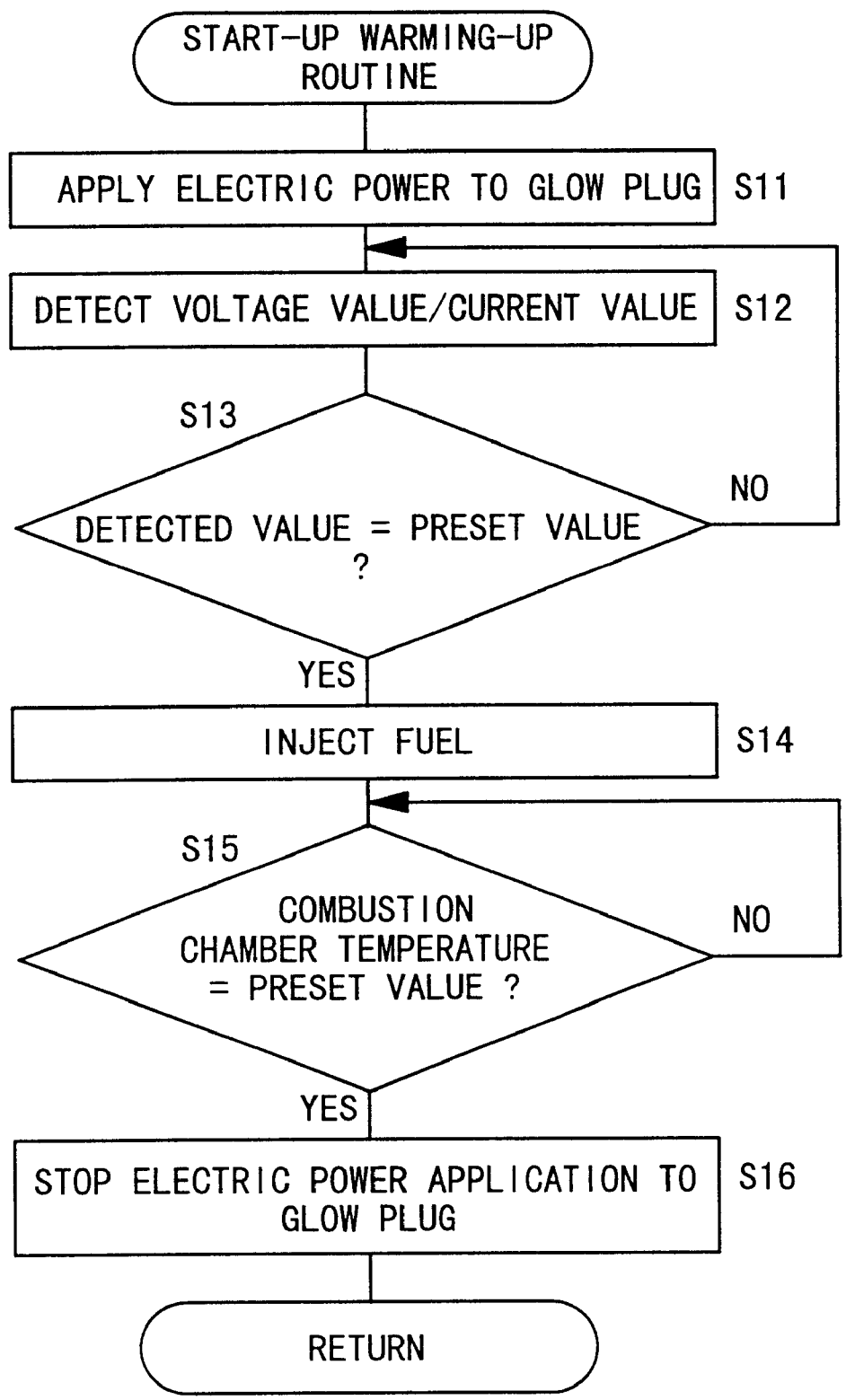
FIG. 13 shows a flow chart of the start-up warming-up routine shown in FIG. 12.

At first, when the fuel-reforming apparatus 10 is started, a start-up warming-up mode (step S1) is given, in which the passages 34b, 34c of the tube 34 are isolated from the fuel cell stack 14. Accordingly, the air (primary air) is supplied via the air nozzle 52 to the combustion chamber 46 from the first air passage 56 of the combustion mechanism 44, and the vortex flow is formed in the combustion chamber 46. In this state, the electric power is applied to the glow plug 49 (step S11 in FIG. 13). The current value of the glow plug 49 is monitored by the voltage/current monitor 126 (step S12).

If ECU calculates that the monitored current value arrives at ±5% to ±10% of the maximum current value with respect to the supplied voltage (YES in the step S13), methanol in the methanol tank 16 is injected into the combustion chamber 46 by the aid of the injector 48 (step S14). Methanol is sprayed into the combustion chamber 46 by the aid of the injector 48. The vortex flow of air acts on the methanol to pulverize and diffuse the methanol. Accordingly, the methanol burns in the combustion chamber 46 in accordance with the heating action of the glow plug 49, and the flame is held only in the combustion chamber 46.

Subsequently, the flame-holding air (secondary air) is introduced from the second air passage 64 via the respective introducing holes 70 into the flow passage chamber 66. Therefore, the air is mixed with the high temperature combustion gas produced in the combustion chamber 46, and the temperature of the combustion gas is adjusted. In this state, the fuel gas is directly supplied to the first and second reforming catalyst layers 38, 40 arranged in the reforming chamber 36.

On the other hand, the temperature of the combustion chamber 46 is detected by the temperature sensor 51. If the temperature in the combustion chamber 46 arrives at a preset value (YES in the step S14), then the routine proceeds to the step S15, the switch 128 is operated, and the electric power application to the glow plug 49 is stopped. Accordingly, the start-up warming-up routine comes to an end.

The amount of methanol sprayed from the injector 48 into the combustion chamber 46 is increased. The water produced by the combustion in the combustion chamber 46, the methanol, and the air introduced from the second air passage 64 are used in the first and second reforming catalyst layers 38, 40 to simultaneously perform the oxidation reaction and the reforming reaction (step S2). Specifically, $CH_3OH+3/2O_2 \rightarrow CO_2+2H_2O$ (exothermic reaction) and $CH_3OH+H_2O \rightarrow CO_2+3H_2$ (endothermic reaction) are simultaneously performed, and the reformed gas containing hydrogen is produced from the first and second reforming catalyst layers 38, 40.

The reformed gas passes from the reformer 26 through the CO eliminator 28, and it is fed to the catalytic burner 24 to be utilized as fuel. The vaporizer 22 is heated thereby (step S3). Subsequently, the routine proceeds to the step S4. If the fourth temperature sensor 122 detects the fact that the temperature of the vaporizer 22 arrives at a preset temperature, the mixer 20 is used to mix methanol and water at a predetermined mixing ratio to provide the aqueous methanol solution which is supplied to the vaporizer 22.

In the vaporizer 22, the aqueous methanol solution is vaporized by the aid of the catalytic burner 24, which is mixed with the air fed from the second air passage 64 to be supplied into the reformer 26 from the respective introducing holes 70 of the supply mechanism 42. On the other hand, the supply of methanol from the injector 48 to the combustion chamber 46 is stopped. The air is continuously supplied from the first air passage 56 via the air nozzle 52 to the combustion chamber 46. Thus, the temperature of the injector 48 itself is effectively lowered.

In the first embodiment, the combustion mechanism 44 is directly connected to the reformer 26. The combustion gas, which is produced in the direct fired type combustion chamber 46 based on the use of hydrocarbon such as methanol as fuel, is directly supplied to the first and second reforming catalyst layers 38, 40 in the reforming chamber 36. Accordingly, for example, the reformer 26 can be heated upon the start-up to the desired temperature for a short period of time. Thus, an effect is obtained in that the time required for the start-up is shortened all at once.

Further, the combustion gas is diluted with the air introduced into the flow passage chamber 66. Therefore, the combustion gas is introduced into the reforming chamber 36 in the state of being controlled for the temperature. The partial oxidation at a constant temperature and the reforming of unburned hydrocarbon are performed. The partial oxidation reaction makes it possible to further raise the temperature in the reformer 26. The reforming reaction is effected from the start-up by using the unburned hydrocarbon and the water produced by the combustion, which causes the production of hydrogen gas. The hydrogen gas is fed to the catalytic burner 24, and it can be utilized as fuel. The hydrogen gas is utilized to raise the temperature of the catalytic burner 24 and the vaporizer 22.

In the case of any sudden increase in load, for example, in the case of any increase in amount of produced hydrogen gas, the shortage of amount of heat can be effectively replenished by instantaneously vaporizing and evaporating the methanol by spraying the methanol from the injector 48. The combustion mechanism 44 is provided concentrically with the first and second reforming catalyst layers 38, 40. It is possible to uniformly warm the whole of the first and second reforming catalyst layers 38, 40 by using the combustion gas.

Further, the first embodiment is provided with the air nozzle 52 for discharging the air from the surroundings of the injector 48 to the combustion chamber 46. The vortex flow of air injected from the air nozzle 52 is used to pulverize and diffuse the methanol sprayed from the injector 48. Thus, it is possible to effect the complete combustion in the narrow range in the combustion chamber 46, and it is possible to limit the range of flame holding. Therefore, it is advantageous that the combustion gas can be reliably controlled to have the desired temperature by using the dilution air introduced from the second air passage 64, while maintaining the reliability of the ignition and the flame-holding performance.

The air is injected from the air nozzle 52 during the steady state operation. Thus, the injector 48 is prevented from heating, and it is possible to reliably avoid production of any accumulated matter on the injector 48. It is unnecessary for the injector 48 to have high heat resistance owing to the cooling effect of the air injected from the air nozzle 52.

Accordingly, it is possible to use an inexpensive injector 48, which is extremely economic.

In the first embodiment, the reformer 26 is designed to have the horizontal structure. The reformable fuel gas, which is mixed with air, is supplied in the horizontal direction (direction of the arrow A) from the flow passage chamber 66 to the reforming chamber 36 having the large volume. In this arrangement, the supply port 60, which is provided at the outer wall of the wall 68 of the flow passage chamber 66, communicates with the plurality of introducing holes 70 via the chamber 72 in the wall 68. The reformable fuel gas (containing air), which is supplied to the supply port 60, is introduced toward the reforming chamber 36 via the flow passage chamber 66 from the plurality of introducing holes 70 provided through the circumferential surface of the inner wall of the wall 68.

Accordingly, the reformable fuel gas is injected from the respective introducing holes 70 which are designed for the discharge angle and the hole diameter respectively. Thus, the delivery performance of the reformable fuel gas is improved. It is possible to uniformly and reliably supply the reformable fuel gas to the entire surface of the first reforming catalyst layer 38.

Figure 14:
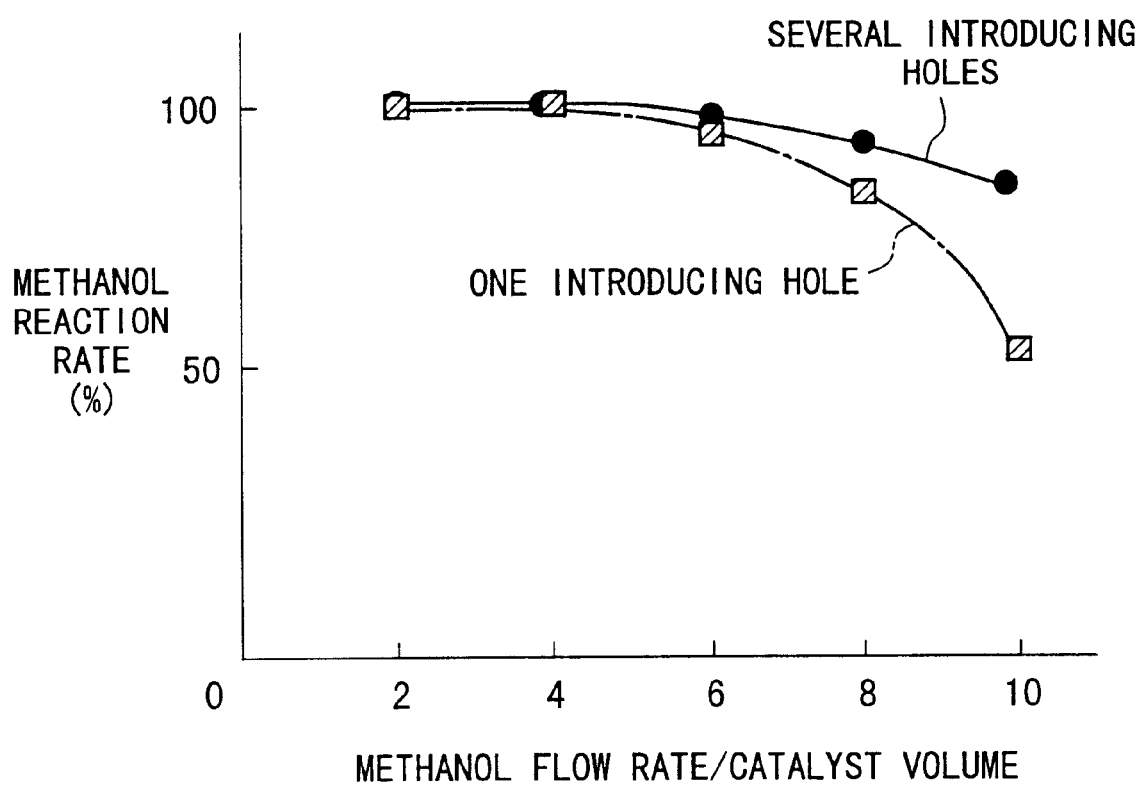
FIG. 14 illustrates the methanol reaction rate based on the use of a single introducing hole or a plurality of introducing holes.

Experiments were performed to produce the reformed gas concerning the case in which the reformable fuel gas was supplied from the plurality of introducing holes 70 into the flow passage chamber 66, and the case in which the reformable fuel gas was supplied from the conventional single introducing hole into the flow passage chamber 66. Obtained results are shown in FIG. 14. Accordingly, the result has been obtained such that the delivery performance for the reformable fuel gas is made uniform in the first embodiment, and it is possible to effectively utilize the entire surface of the first reforming catalyst layer 38.

The reformable fuel gas, which is supplied from the vaporizer 22 to the passage 34*a*, is mixed with the air injected from the second air passage 64, and it is introduced into the reformer 26. After that, the reformable fuel gas is fed to the diffuser section 76. In the diffuser section 76, a part of the reformable fuel gas containing the aqueous methanol solution, the steam, and the oxygen is fed along the gas supply flow passage 68 to the first reforming catalyst layer 38. On the other hand, the other part passes through the interior of the cylindrical section 88 inserted and fitted to the central hollow portion 38a of the first reforming catalyst layer 38, and it is fed to the second reforming catalyst layer 40 (step S5).

In the first and second reforming catalyst layers 38, 40, the methanol, the steam, and the oxygen in the reformable fuel gas are used to simultaneously perform the oxidation reaction as the exothermic reaction and the fuel-reforming reaction as the endothermic reaction. Accordingly, it is unnecessary to use any complicated heat transfer structure in the reformer 26. It is possible to greatly simplify the whole structure of the reformer 26. Further, the heat necessary for the reforming reaction is supplied by the exothermic reaction effected in the reformer 26. Therefore, good response is obtained with respect to any variation in load. Thus, it is possible to efficiently produce the reformed gas containing hydrogen gas.

The reformed gas produced through the passage of the first reforming catalyst layer 38 and the reformed gas produced through the passage of the second reforming catalyst layer 40 are introduced into the heat exchanger 32 to be cooled to a predetermined temperature. Subsequently, the reformed gas is introduced into the CO eliminator 28, and CO in the reformed gas is selectively reacted and removed. After that, the CO concentration in the reformed gas is measured by the aid of the CO sensor 124. If it is judged that the measured CO concentration is not more than a predetermined value (YES in the step S6), the routine proceeds to the step S7 to switch the three-way valve 90. Thus, the reformed gas is supplied to the fuel cell stack 14.

In the first embodiment, the combustion chamber 46 communicates with the reforming chamber 36. Methanol is injected as heating fuel into the combustion chamber 46. The electric power is applied to the glow plug 49, and the methanol burns in the combustion chamber 46. The combustion gas produced by the combustion is directly supplied to the first and second reforming catalyst layers 38, 40 in the reforming chamber 36. Therefore, the first and second reforming catalyst layers 38, 40 are quickly heated. Thus, an effect is obtained in that the warming-up operation is effected in an extremely short period of time when the fuel-reforming apparatus 10 is started.

In the first embodiment, after the first and second reforming catalyst layers 38, 40 arrive at the predetermined temperature by the aid of the combustion gas produced in the combustion chamber 46, the reformed gas, which is produced from the first and second reforming catalyst layers 38, 40, is supplied to the catalytic burner 24, and it is used as fuel for heating the vaporizer 22. Accordingly, the fuel is efficiently used, and the warming-up operation is performed in a shorter period of time.

After the first and second reforming catalyst layers 38, 40 and the vaporizer 22 arrive at the predetermined temperatures, the reformable fuel is supplied to produce the reformed gas. When the CO concentration in the reformed gas is not more than the predetermined value, the reformed gas is supplied to the fuel cell stack 14. Therefore, the following effect is obtained. That is, the simple system can be used to reliably judge the fact that the desired reformed gas is produced. The preparatory operation including the warming-up operation for the whole of the fuel-reforming apparatus 10 is efficiently performed all at once. The power generation operation is efficiently performed by the fuel cell stack 14.

In the first embodiment, the electric power is applied to the glow plug 49 during the start-up warming-up operation, and then the voltage/current monitor 126 is used to monitor the current value of the glow plug 49. Accordingly, when the glow plug 49 arrives at the temperature capable of ignition, the methanol as the fuel is injected from the injector 48 into the combustion chamber 46. Therefore, it is advantageous that the reliability of ignition can be ensured in the combustion chamber 46.

When the temperature sensor 51 is used to detect the fact that the temperature in the combustion chamber 46 arrives at the temperature capable of self-flame holding, the electric power application to the glow plug 49 is stopped. Accordingly, the following effect is obtained. That is, the self-heat generation of the glow plug 49 is stopped after the ignition. The durability of the glow plug 49 is effectively improved, making it possible to use the glow plug 49 for a long term.

In the first embodiment, each of the first and second reforming catalyst layers 38, 40 is designed to have the hollow plate-shaped configuration. Therefore, the case 78 for constructing the reformer 26 can be designed to have the cylindrical configuration. The occurrence of stress concentration is avoided, and it is possible to use the thin wall of the case 78. Owing to the hollow plate shape possessed by the first and second reforming catalyst layers 38, 40, the central portion thereof is utilized as the passage, and the gas is allowed to flow from the center to the outer circumference. Accordingly, it is possible to stack the first and second reforming catalyst layers 38, 40 in the multiple layers.

Owing to the thin-walled design of the first and second reforming catalyst layers 38, 40, it is possible to maintain the high catalyst outlet temperature which is important for the reforming reaction. That is, the result shown in FIG. 8 has been obtained as a result of the change of the thickness "h" of the reforming catalyst layer M when the reformed gas is produced by introducing the raw material gas (fuel gas) into the reforming catalyst layer M as shown in FIG. 7. The maximum temperature of the reforming catalyst layer M is controlled to be 325° C. The following result has been obtained. That is, the thinner the thickness "h" of the reforming catalyst layer M is, the higher the methanol reaction rate is, and the performance is improved.

Accordingly, the first and second reforming catalyst layers 38, 40 are made thin. Thus, the following effect is obtained. That is, the reformed gas is efficiently produced. The temperature of the whole of the first and second reforming catalyst layers 38, 40 is made uniform. Further, the pressure loss is reduced.

In the first embodiment, the first and second reforming catalyst layers 38, 40 are aligned in the gas flow direction. The gas flow passage-forming means 86 is used to make division into the gas flow passages to pass through only the first and second reforming catalyst layers 38, 40 respectively. Therefore, it is possible to arrange, in the small volume in the reformer 26, the first and second reforming catalyst layers 38, 40, or catalyst layers of a number larger than the above. It is possible to effectively miniaturize the reformer 26. Further, the gas can be supplied uniformly to the first and second reforming catalyst layers 38, 40. The reformed gas can be produced efficiently.

The reformer 26 is provided with the diffuser section 76 at the intermediate position from the combustion chamber 46 to the reforming chamber 36, for forming the conical gas supply flow passage 74 with the diameter increasing toward the gas flow direction. Accordingly, the reformable supply gas can be supplied equivalently in the radial direction of the first reforming catalyst layer 38. The reforming reaction is efficiently performed. Further, the reformed gas, which is reformed through the passage of the first reforming catalyst layer 38, is supplied to the outer circumferential portion of the second reforming catalyst layer 40 along the conical section 90 for constructing the gas flow passage-forming means 86. Therefore, it is possible to avoid the heat release from the outer circumferential portion of the second reforming catalyst layer 40. It is possible to equivalently maintain the temperature distribution in the radial direction of the second reforming catalyst layer 40.

The conical cover member 96 is installed to the central hollow portion 40a of the second reforming catalyst layer 40. Accordingly, the reformable fuel gas, which passes through the central hollow portion 38a of the first reforming catalyst layer 38 to arrive at the cover member 96, is smoothly supplied along the inclination of the cover member 96 in the radial direction of the second reforming catalyst layer 40. It is possible to perform the efficient reforming reaction. Each of the first and second reforming catalyst layers 38, 40 constitutes the honeycomb carry catalyst layer. It is possible to effectively enlarge the surface area of the catalyst.

In the first embodiment, the first and second flow-regulating plates 80, 82 are provided on the upstream sides of the first and second reforming catalyst layers 38, 40 respectively. Therefore, even when the angle of the diffuser section 76 is set to be extreme, the reformable fuel gas, which is supplied from the flow passage chamber 66, can be allowed to flow at the uniform flow rate to the entire surfaces of the first and second reforming catalyst layers 38, 40.

Accordingly, the following effect is obtained. That is, the whole of the reformer 26 is greatly miniaturized. The uniform load is applied to the entire surfaces of the first and second reforming catalyst layers 38, 40. It is possible to maximally utilize the performance possessed by the first and second reforming catalyst layers 38, 40.

The first and second reforming catalyst layers 38, 40 are aligned in the horizontal direction which is the gas flow direction of the reformable fuel gas. The first and second flow-regulating plates 80, 82 are designed to have the different flow-regulating functions depending on the state of the flow of the reformable fuel gas. Therefore, even when the first and second reforming catalyst layers 38, 40 are arranged closely to one another, it is possible to apply the uniform load to the entire surfaces of the first and second reforming catalyst layers 38, 40. It is possible to construct the more compact reformer 26.

Figure 17:
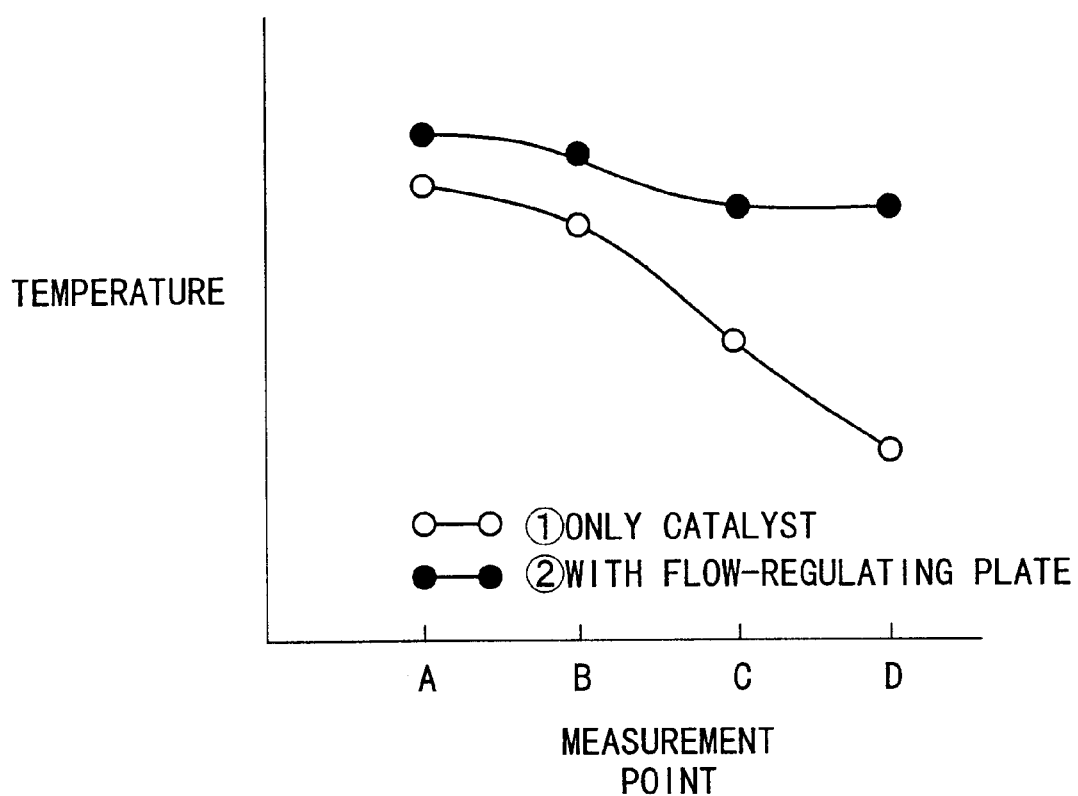
FIG. 17 illustrates results of measurement of the temperature at respective portions by using those shown in FIGS. 15 and 16.

Experiments were carried out to detect the temperature change at respective measurement points A to D concerning the case in which only the first reforming catalyst layer 38 was used without using the flow-regulating plate 80 (see FIG. 15), and the case in which the first flow-regulating plate 80 was provided on the upstream side of the reforming catalyst layer 38 as in the first embodiment (see FIG. 16). Obtained results are shown in FIG. 17.

Therefore, when the diffuser section 76 having the extreme angle is used, the following fact has been revealed. That is, the temperature is low in the first reforming catalyst layer 38 for which the first flow-regulating plate 80 is not used, especially at the measurement points C and D disposed at the outer circumferential portions, and the reforming reaction is scarcely effected at these portions. Accordingly, it has been demonstrated that when the first flow-regulating plate 80 is used, then the uniform flow of the reformable fuel gas is generated over the entire surface of the first reforming catalyst layer 38, and the efficient reforming reaction is performed.

In the first embodiment, the difference between the peak temperature and the gas outlet temperature in the first and second reforming catalyst layers 38, 40 is set to be within 100° C., more preferably within 50° C. Therefore, it is possible to set the high gas outlet temperature which is especially important for the reforming reaction, with respect to the constant peak temperature (for example, the peak temperature within the range of 300° C. to 350° C.). Accordingly, the following effect is obtained. That is, the thermal deterioration of the first and second reforming catalyst layers 38, 40 is effectively avoided. The reforming reaction is actively effected. It is possible to effectively utilize the whole of the first and second reforming catalyst layers 38, 40.

It is possible to reduce the necessary amount of the catalyst. It is possible to easily realize the miniaturized reformer 26 as a whole having the light weight at the low cost. The thickness "h" of the first and second reforming catalyst layers 38, 40 can be set to be considerably thin. Therefore, the temperature of the entire reformer 26 is made uniform. It is advantageous that the pressure loss can be reduced for the first and second reforming catalyst layers 38, 40.

In the first embodiment, the first temperature sensor 104 for detecting the peak temperature in the first and second reforming catalyst layers 38, 40 is arranged in the reformer 26. For example, when the first and second reforming catalyst layers 38, 40 are based on a copper catalyst, it is preferable to perform the operation at a peak temperature of about 300° C. considering the durability.

Accordingly, the first temperature sensor 104 is used to detect the peak temperature of the first and second reforming catalyst layers 38, 40. If the detected temperature is lower than 300° C., ECU operates the first air supply valve 112 to increase the supply amount of oxygen (air) to be supplied to the reformer 26. Accordingly, the combustion reaction (exothermic reaction) is further facilitated in the oxidation reaction-dominant region 106 of the first and second reforming catalyst layers 38, 40, and the peak temperature can be raised up to 300° C.

As described above, in the first embodiment, the following effect is obtained. That is, it is possible to maintain the constant peak temperature at the inside of the first and second reforming catalyst layers 38, 40. It is possible to avoid the occurrence of local thermal deterioration in the first and second reforming catalyst layers 38, 40. It is possible to use the first and second reforming catalyst layers 38, 40 highly efficiently and effectively. Further, it is possible to decrease the necessary amount of the catalyst, because the first and second reforming catalyst layers 38, 40 can be used highly efficiently. Thus, it is easy to realize the miniaturized reformer 26 as a whole at the low cost.

In the first embodiment, the first and second reforming catalyst layers 38, 40 are arranged at the two stages in the reforming chamber 36. However, there is no limitation thereto. The same effect can be obtained, for example, even when the reforming catalyst layers are provided at three or more stages.

Figure 18:
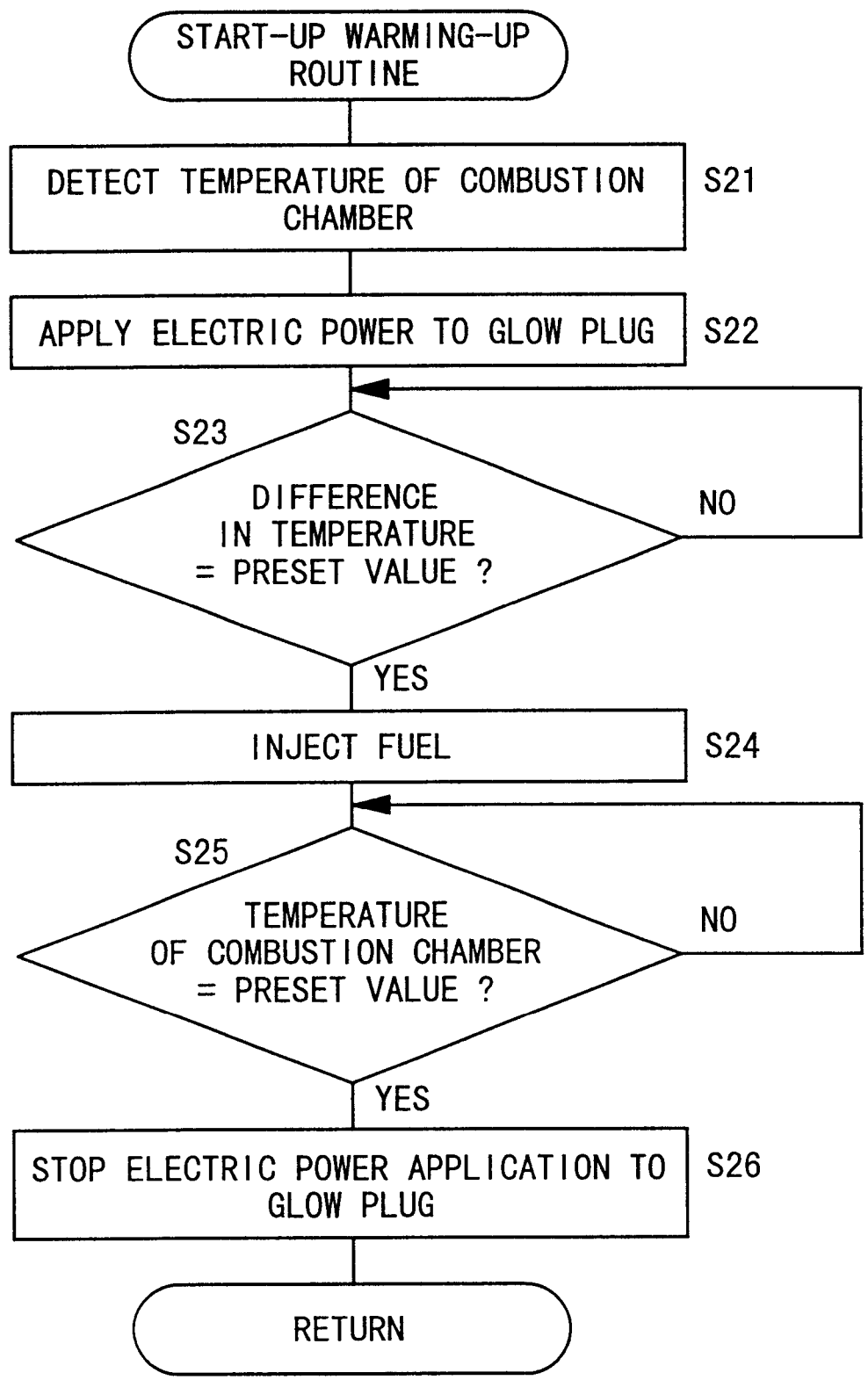
FIG. 18 shows a flow chart of a start-up warming-up routine illustrating a control method according to a second embodiment of the present invention.

FIG. 18 shows a flow chart of a start-up warming-up routine illustrating a control method according to the second embodiment of the present invention.

In the second embodiment, the temperature sensor 51 detects the temperature of the combustion chamber 46 on the basis of the start signal (step S21), while the electric power is applied to the glow plug 49 (step S22). ECU 110 monitors the temperature in the combustion chamber 46 by the aid of the temperature sensor 51, and it calculates the temperature difference ΔT in the combustion chamber 46 between the temperatures before and after the electric power application to the glow plug 49.

If it is judged that the temperature difference ΔT is not less than a predetermined temperature, for example, not less than 50° C. (YES in the step S23), the routine proceeds to the step S24 to inject methanol as fuel from the injector 48 into the combustion chamber 46. When the temperature in the combustion chamber 46 arrives at a preset temperature (YES in the step S25), the electric power application to the glow plug 49 is stopped (step S26).

As described above, in the second embodiment, the temperature difference ΔT in the combustion chamber 46 between the temperatures before and after the electric power application to the glow plug 49 is calculated. If the temperature difference ΔT is not less than the preset temperature, i.e., if the temperature capable of ignition is obtained, then the methanol is injected from the injector 48 into the combustion chamber 46. Therefore, the same effect as that obtained in the first embodiment is obtained, for example, in that the reliability of ignition can be ensured in the combustion chamber 46.

Figure 19:
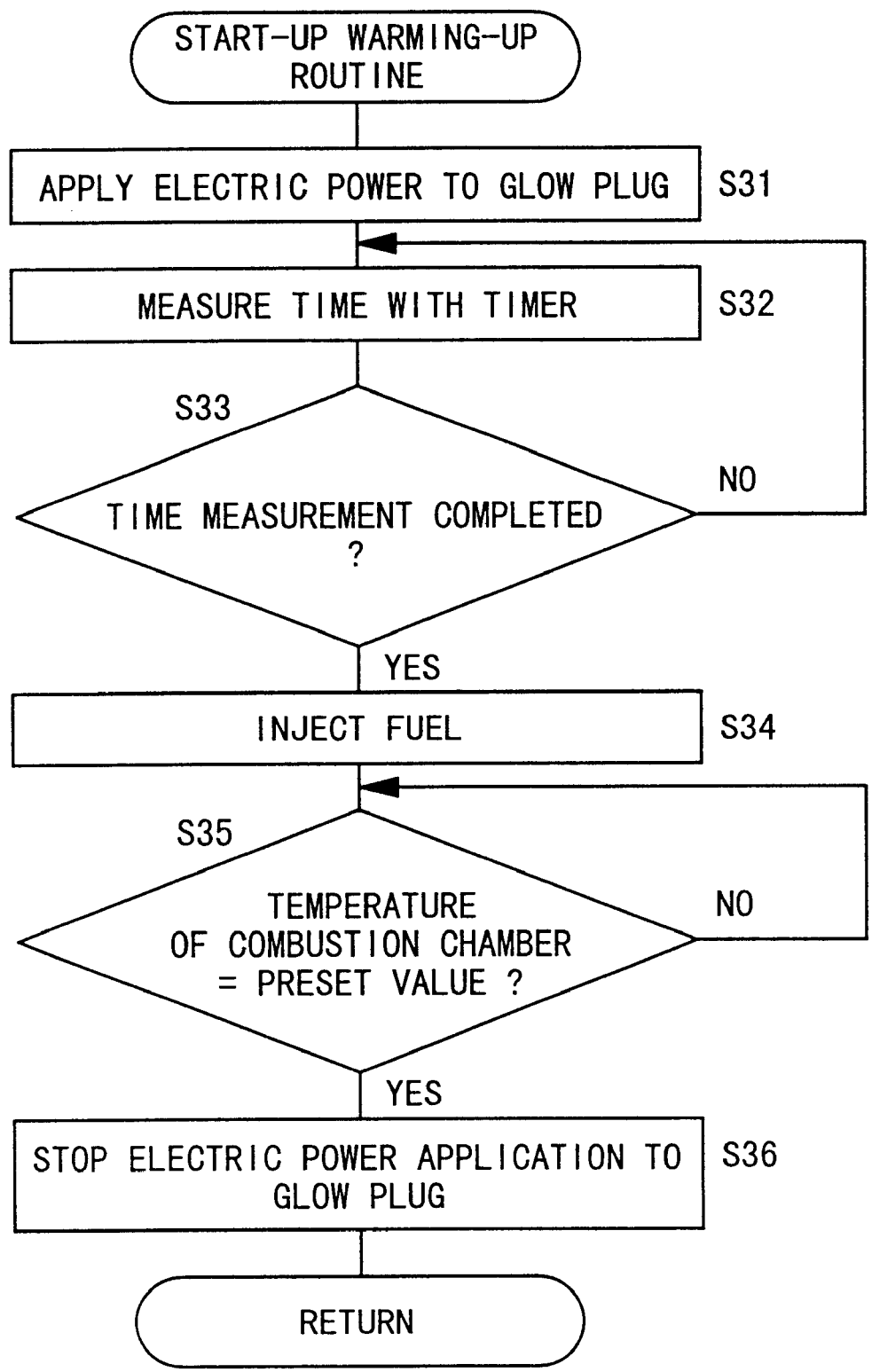
FIG. 19 shows a flow chart of a start-up warming-up routine illustrating a control method according to a third embodiment of the present invention.

FIG. 19 shows a flow chart of a start-up warming-up routine for carrying out a control method according to the third embodiment of the present invention.

In the third embodiment, after the electric power is applied to the glow plug 49 (step S31), the time measurement with a timer of ECU 110 is started (step S32). After the timer measures a predetermined period of time (YES in the step S33), methanol is injected into the combustion chamber 46 by the aid of the injector 48 (step S34). When the temperature in the combustion chamber 46 is not less than a preset temperature (YES in the step S35), the routine proceeds to the step S36 to stop the electric power application to the glow plug 49.

As described above, in the third embodiment, the methanol as fuel is injected into the combustion chamber 46 after the passage of the preset period of time as calculated by ECU 110 on the basis of, for example, environmental conditions after the glow plug 49 is applied with the electric power. Accordingly, an effect is obtained in that the reliability of ignition is ensured in the combustion chamber 46, in the same manner as in the first and second embodiments.

Next, a control method according to the fourth embodiment of the present invention will be explained with reference to FIG. 9.

In the fourth embodiment, the CO sensor 124 is not used. The CO concentration or the residual methanol concentration in the reformed gas is estimated on the basis of the temperature in the reformer 26, especially the reformed gas outlet temperature of the catalyst layer detected by the third temperature sensor 120, and the supply amount of the reformable fuel gas supplied to the reformer 26.

Figure 20:
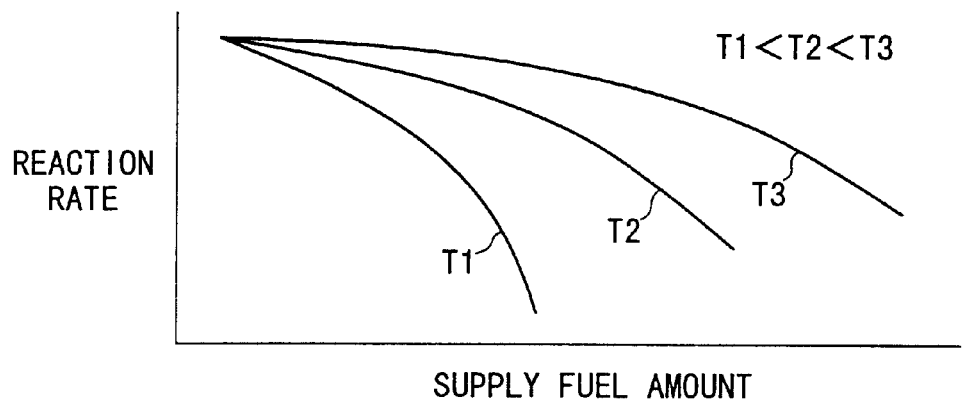
FIG. 20 shows the relationship between the supply amount of the reformable fuel gas and the methanol reaction rate.
Figure 21:
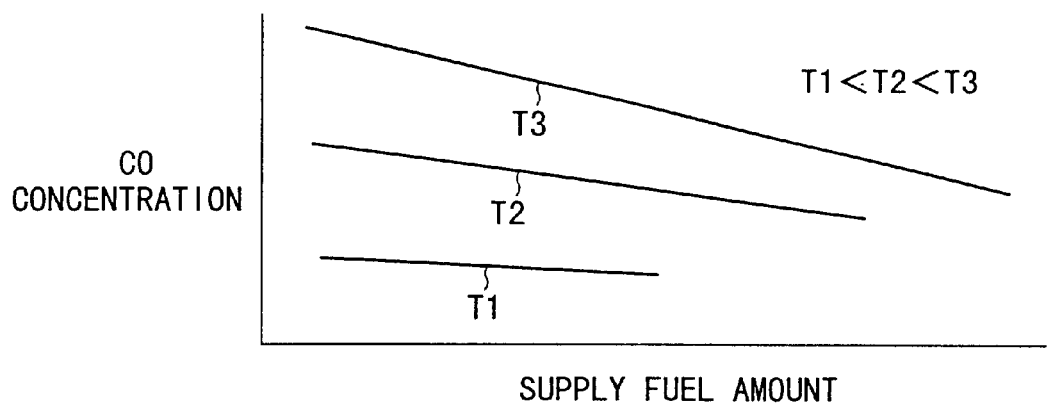
FIG. 21 shows the relationship between the reformable fuel gas and the CO concentration.
Figure 22:
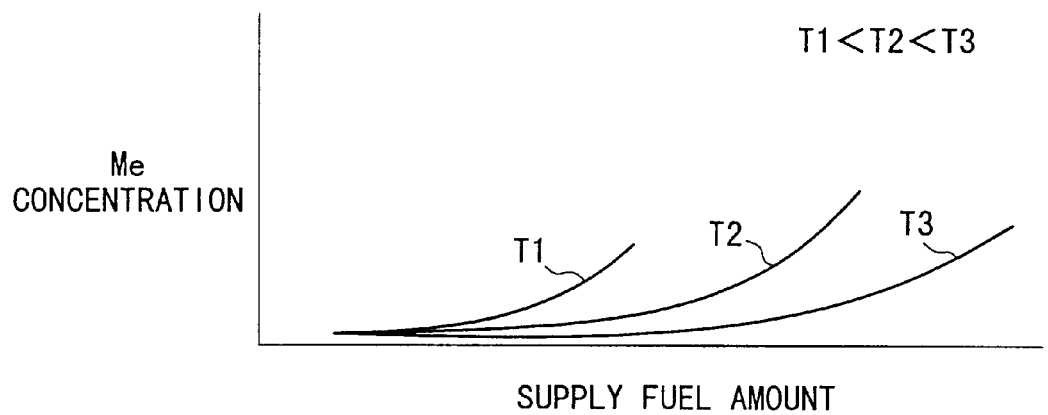
FIG. 22 shows the relationship between the reformable fuel gas and the residual methanol concentration.

In this embodiment, the conditions shown in FIGS. 20, 21, and 22 are previously recorded as maps in ECU 110. FIG. 20 shows the relationship between the supply amount of the reformable fuel gas and the reaction rate of methanol, concerning the reformed gas outlet temperatures T1, T2, and T3 (T1<T2<T3). FIG. 21 shows the relationship between the supply amount of the reformable fuel gas and the CO concentration for each of the reformed gas outlet temperatures T1, T2, and T3. FIG. 22 shows the relationship between the supply amount of the reformable fuel gas and the residual methanol concentration for each of the reformed gas outlet temperatures T1, T2, and T3.

In the fourth embodiment, as shown in FIG. 9, ECU 110 controls the fuel supply valve 114 to set the supply amount of the aqueous methanol solution supplied to the vaporizer 22. The first air supply valve 112 is operated to set the supply amount of the oxidizing air. Accordingly, the reformable fuel gas and the oxidizing air, which are in the predetermined amounts respectively, are introduced into the reformer 26. The reformed gas is produced by the aid of the first and second reforming catalyst layers 38, 40.

In the first and second reforming catalyst layers 38, 40, the oxidation reaction and the reforming reaction are simultaneously performed by supplying the aqueous methanol solution, the steam, and the oxygen. Thus, the so-called autothermal reaction is carried out. Accordingly, the temperature of the reformable fuel gas is inputted into ECU 110 by the aid of the second temperature sensor 118. The peak temperature of the catalyst is inputted thereinto by the aid of the first temperature sensor 104, and the reformed gas outlet temperature is inputted thereinto by the aid of the third temperature sensor 120.

ECU 110 estimates the CO concentration (or the residual methanol concentration) on the basis of the previously set supply amount of the reformable fuel gas and the reformed gas outlet temperature detected by the third temperature sensor 120. The amount of air to be supplied to the CO eliminator 28 is adjusted by the second air supply valve 116 on the basis of the CO concentration.

As described above, in the fourth embodiment, the various sensors such as the CO sensor are not used. The CO concentration (or the residual methanol concentration) in the reformed gas is estimated on the basis of the supply amount of the reformable fuel gas supplied to the reformer 26 and the reformed gas outlet temperature in the reformer 26. Accordingly, the following effect is obtained. That is, it is unnecessary to use expensive sensors. The state of the reforming reaction can be recognized economically and correctly. The desired reformed gas can be reliably supplied to the fuel cell stack 14.

Figure 23:
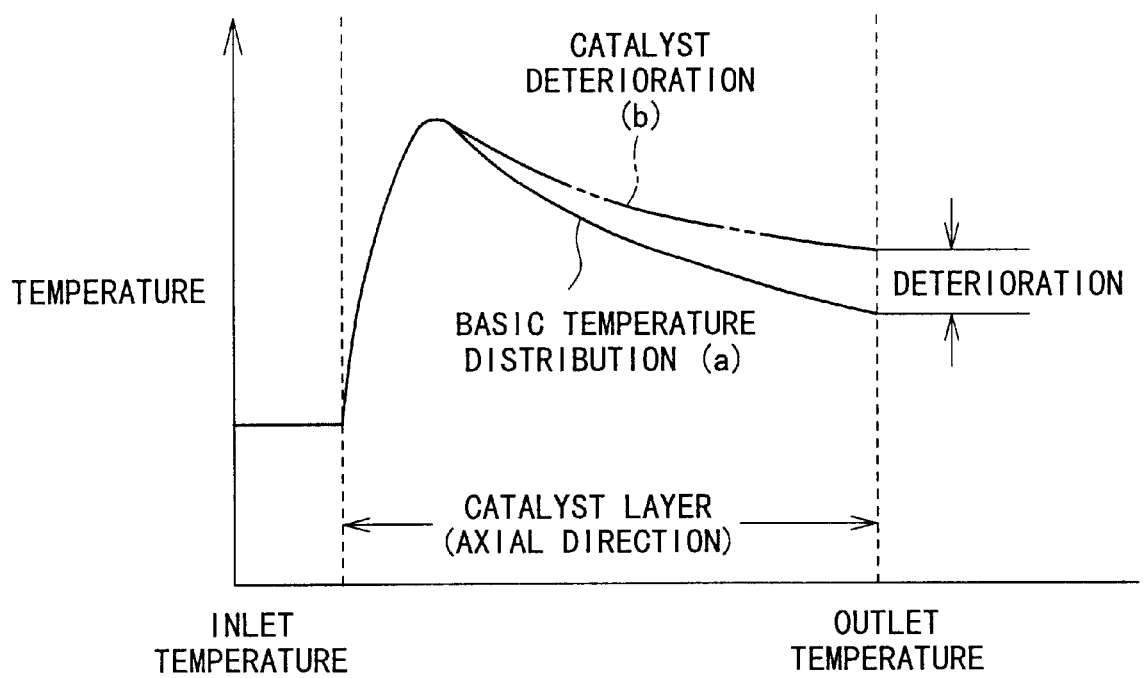
FIG. 23 shows the relationship between the catalyst layer and the temperature for illustrating the deterioration of the catalyst performance.

When the first and second reforming catalyst layers 38, 40 are continuously used, the deterioration of performance occurs in some cases. For this reason, ECU 110 performs the process for correcting the reformed gas outlet temperature concerning the first and second reforming catalyst layers 38, 40 with any deteriorated catalyst performance. That is, as shown in FIG. 23, the basic temperature distribution (a) has been compared with the temperature distribution (b) obtained when the catalyst performance is deteriorated, while maintaining a constant inlet temperature of the catalyst layer. As a result, the reaction amount is decreased in accordance with the deterioration of the catalyst performance. Therefore, in the case of the temperature distribution (b), the amount of endothermic heat is decreased, and the reaction gas outlet temperature is increased.

Therefore, the degree of deterioration is reliably estimated on the basis of the supply amount of the reformable fuel gas, the catalyst inlet temperature, the supply air amount, and the reformed gas outlet temperature. The amount of deterioration of the first and second reforming catalyst layers 38, 40 is judged on the basis of the obtained result. Accordingly, the deterioration amount can be previously correlated with the temperature. It is advantageous that the CO concentration (or the residual methanol concentration) in the reformed gas can be correctly detected in response to the degree of deterioration.

Figure 24:
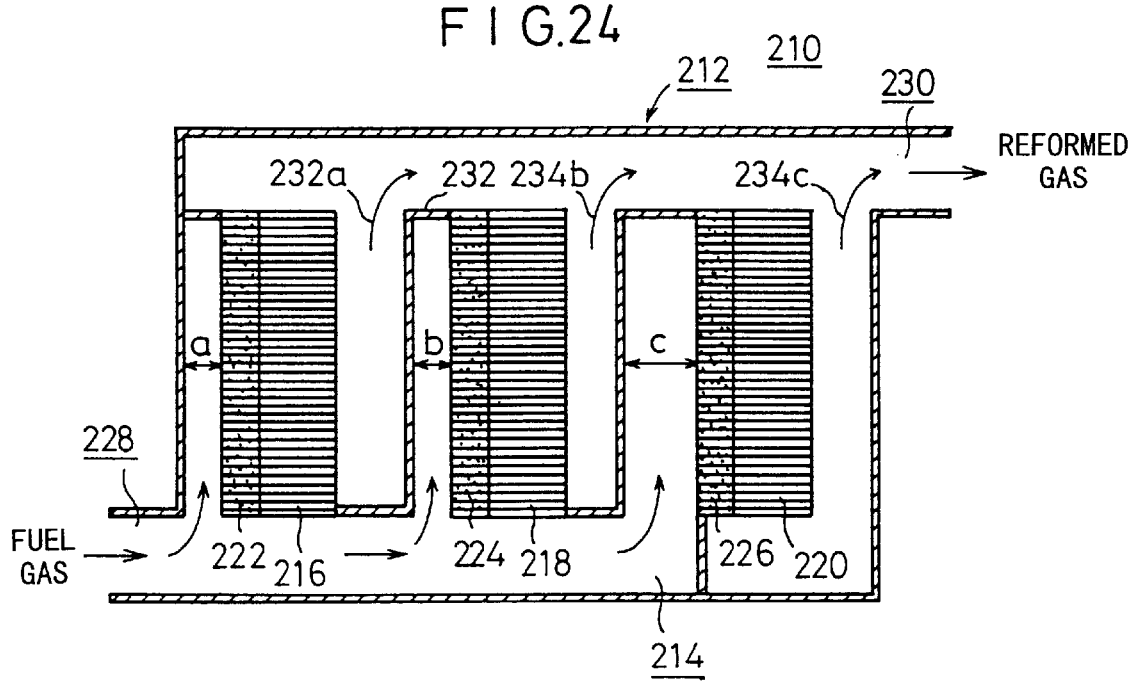
FIG. 24 shows a longitudinal sectional view illustrating principal parts of a reformer for constructing a fuel-reforming apparatus according to a fifth embodiment of the present invention.

FIG. 24 shows a longitudinal sectional view illustrating principal parts of a reformer 212 for constructing a fuel-reforming apparatus 210 according to the fifth embodiment of the present invention. The reformer 212 adopts the horizontal structure, in which the reformable fuel gas is supplied in the horizontal direction as shown by the arrows. First to third reforming catalyst layers 216, 218, 220 are arranged in the gas flow direction (horizontal direction) in a reforming chamber 214 in the reformer 212. First to third flow-regulating plates 222, 224, 226 are provided on the respective upstream sides thereof.

The reformer 212 is provided with a gas-introducing port 228 and a gas discharge port 230. The cross-sectional area of the gas-introducing port 228 is designed to have a value considerably smaller than the cross-sectional area of the first reforming catalyst layer 216.

In the reforming chamber 214, widthwise dimensions "a", "b", and "c" are defined by the first to third reforming catalyst layers 216, 218, 220 respectively. The flow state of the reformable fuel gas differs with respect to the first to third catalyst layers 216, 218, 220. The first to third flow-regulating plates 222, 224, 226 are designed to have flow-regulating functions depending on the flow states of the reformable fuel gas respectively. Specifically, the flow-regulating functions are set by changing the widthwise dimension and the structural roughness.

A gas flow passage-forming means 232 is arranged in the reforming chamber 214 so that the reformable fuel gas passes rat through only one of the first to third reforming catalyst layers 216, 218, 220. Three gas flow passages 234a, 234b, 234c, which are indicated by the arrows respectively, are formed by the gas flow passage-forming means 232 in the reforming chamber 214.

In the reformer 212 constructed as described above, the reformable fuel gas is introduced from the gas-introducing port 228 having the small opening cross-sectional area into the reforming chamber 214 having the considerably large opening cross-sectional area. The reformable fuel gas is distributed to the gas flow passages 234a, 234b, 234c, and it is supplied to the first flow-regulating plate 222, the second flow-regulating plate 224, and the third flow-regulating plate 226 respectively. Accordingly, the reformable fuel gas can be allowed to flow uniformly over the entire surfaces of the first to third reforming catalyst layers 216, 218, 220. It is possible to apply the uniform load to the entire surfaces of the first to third reforming catalyst layers 216, 218, 220.

The flow-regulating functions are set for the first to third flow-regulating plates 222, 224, 226 respectively. Thus, the flow of the reformable fuel gas can be made uniform for the first to third reforming catalyst layers 216, 218, 220 as a whole. Accordingly, the reformable fuel gas is allowed to flow uniformly to the first to third reforming catalyst layers 216, 218, 220 which are arranged as a large number of individuals. It is possible to further miniaturize the whole of the reformer 212.

Figure 25:
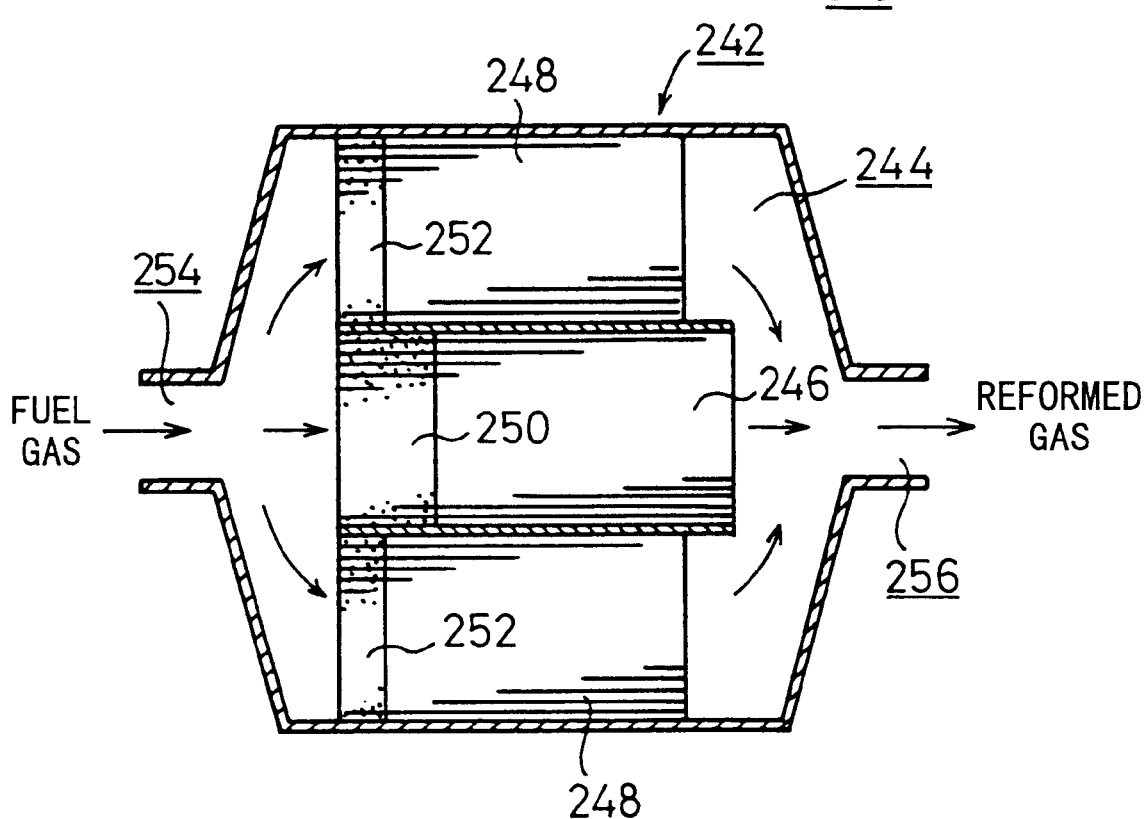
FIG. 25 shows a schematic arrangement illustrating a reformer for constructing a fuel-reforming apparatus according to a sixth embodiment of the present invention.

FIG. 25 shows a schematic arrangement illustrating a reformer 242 for constructing a fuel-reforming apparatus 240 according to the sixth embodiment of the present invention. A first reforming catalyst layer 246 and a second reforming catalyst layer 248 are arranged in a direction perpendicular to the flow direction of the reformable fuel gas in a reforming chamber 244 of the reformer 242. Specifically, the second reforming catalyst layer 248 has a hollow plate-shaped configuration, and the first reforming catalyst layer 236 is arranged at a central hollow portion thereof.

Alternatively, a plurality of cylindrical second reforming catalyst layers 248 may be arranged along the outer circumference of the first reforming catalyst layer 246.

A first flow-regulating plate 250 is provided on the upstream side of the first reforming catalyst layer 246. A second flow-regulating plate 252 is provided on the upstream side of the second reforming catalyst layer 248. A gas-introducing port 254 and a gas discharge port 256 are formed at both right and left ends of the reformer 242. The reformable fuel gas is introduced in the horizontal direction from the gas-introducing port 254 into the reforming chamber 244 having a large opening cross-sectional area.

A large amount of the reformable fuel gas flows through the central portion of the reforming chamber 244. Therefore, the first flow-regulating plate 250, which is provided for the first reforming catalyst layer 246 arranged at the central portion, is designed to have a structure in which the gas flows with difficulty as compared with the second flow-regulating plate 252 which is provided for the second reforming catalyst layer 248. Specifically, the thickness of the first flow-regulating plate 250 is set to be larger than the thickness of the second flow-regulating plate 252.

Accordingly, in the sixth embodiment, the reformable fuel gas can be allowed to flow uniformly through the whole of the first and second reforming catalyst layers 246, 248. Thus, for example, an effect is obtained in that the performance of the first and second reforming catalyst layers 246, 248 can be maximally utilized.

Figure 26:
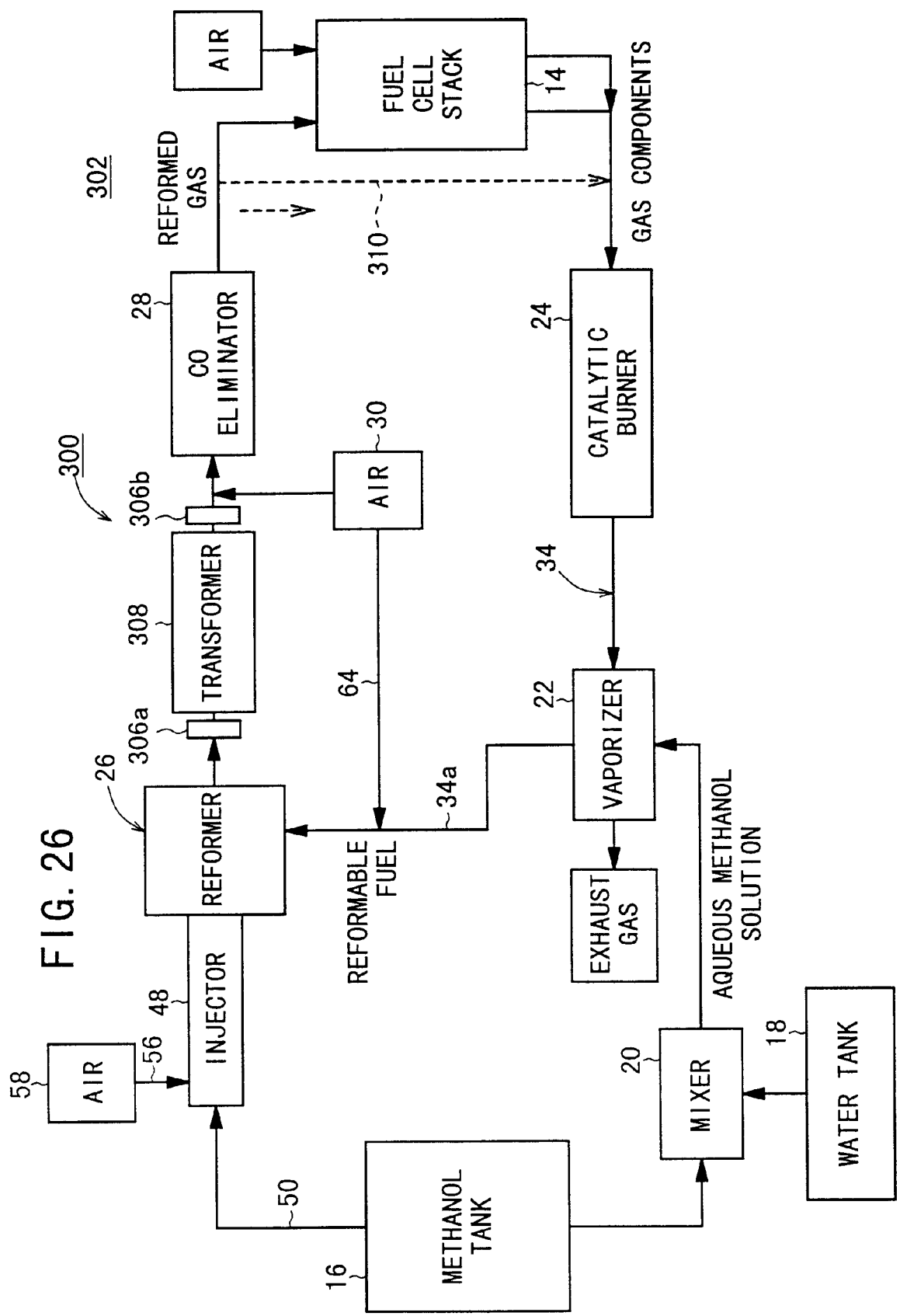
FIG. 26 shows a schematic arrangement illustrating a fuel cell system for incorporating a fuel-reforming apparatus according to a seventh embodiment of the present invention.

FIG. 26 shows a schematic arrangement illustrating a fuel cell system 302 for incorporating a fuel-reforming apparatus 300 according to the seventh embodiment of the present invention. The same constitutive components as those of the fuel cell system 12 according to the first embodiment are designated by the same reference numerals, detailed explanation of which will be omitted.

The fuel-reforming apparatus 300 comprises heat exchangers 306a, 306b for lowering the temperature of the reformed gas disposed between the reformer 26 and the CO eliminator 28. The heat exchangers 306a, 306b are arranged to interpose a transformer 398 for the reaction of residual methanol and the removal of carbon monoxide. The vaporizer 22, the reformer 26, the heat exchangers 306a, 306b, the CO eliminator 28, and the catalytic burner 24 are connected to one another via the tube 34 to form a circulating flow passage via a bypass flow passage 310.

The reformer 26 is provided with an outer case 312 which is installed to surround an inner case 76a. The outer case 312 is composed of a thin-walled substantially cylindrical member. A heat-insulating space 314 is formed between the outer case 312 and the outer wall of the inner case 76a. The outer case 312 is provided in an integrated manner ranging from the reforming chamber 36 to the flow passage chamber 66 and the combustion chamber 46.

Figure 27:
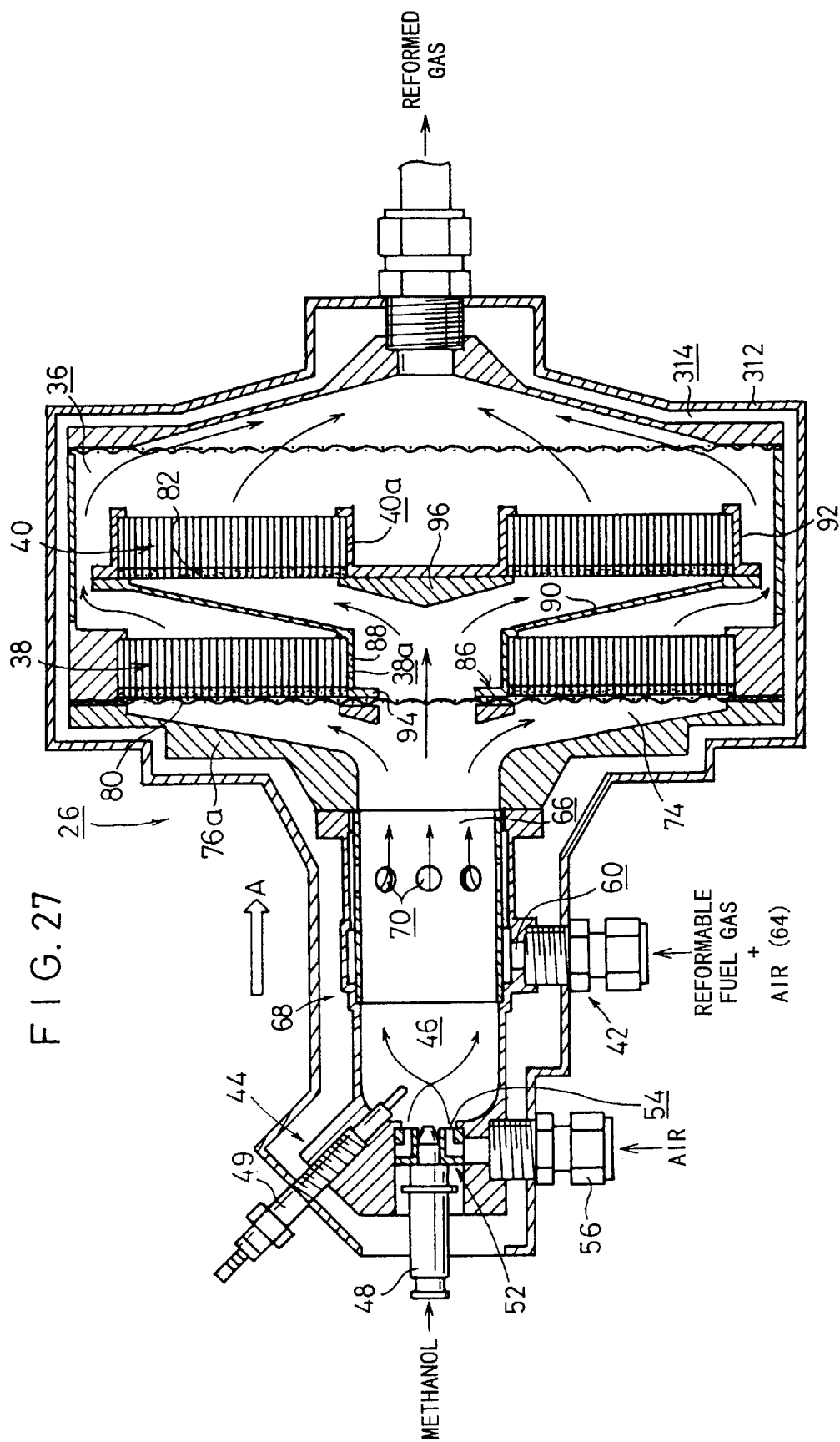
FIG. 27 shows a longitudinal sectional view illustrating a reformer for constructing the fuel-reforming apparatus.

In the fuel-reforming apparatus 300 constructed as described above, the outer case 312 is provided to surround the inner case 76a as shown in FIG. 27. The heat-insulating space 314 is formed in the outer case 312 ranging over the reforming chamber 36, the flow passage chamber 66, and the combustion chamber 46. Accordingly, the combustion gas, which is produced by the combustion mechanism 44, is subjected to the reduction of heat consumption amount which would be otherwise caused by the heat release to the outside, and it is reliably supplied to the first and second reforming catalyst layers 38, 40 while maintaining a high temperature. Further, the reformed gas, which is produced in the first and second reforming catalyst layers 38, 40, is supplied to the transformer 308 in a state in which the heat consumption amount due to the heat release to the outside is reduced in the same manner as described above.

Accordingly, the thermal energy of the combustion gas can be effectively utilized. It is unnecessary to individually install any heat-insulating member to the outer wall. The desired heat-insulating effect can be obtained only by using the thin-walled plate-shaped outer case 312. Further, an effect is obtained in that it is possible to easily provide the reformer 26 which is compact and economic.

The reformer 26 adopts the double cylinder case structure composed of the inner case 76a and the outer case 312. Accordingly, even when the reformer 26 has a relatively light weight, it is possible to effectively improve the rigidity as a whole.

The double cylinder case structure is adopted for the reformer 26 in the seventh embodiment. However, a similar double cylinder case structure can be also adopted for the transformer 308, the CO eliminator 28, the catalytic burner 24, or the tube 34.

Figure 28:
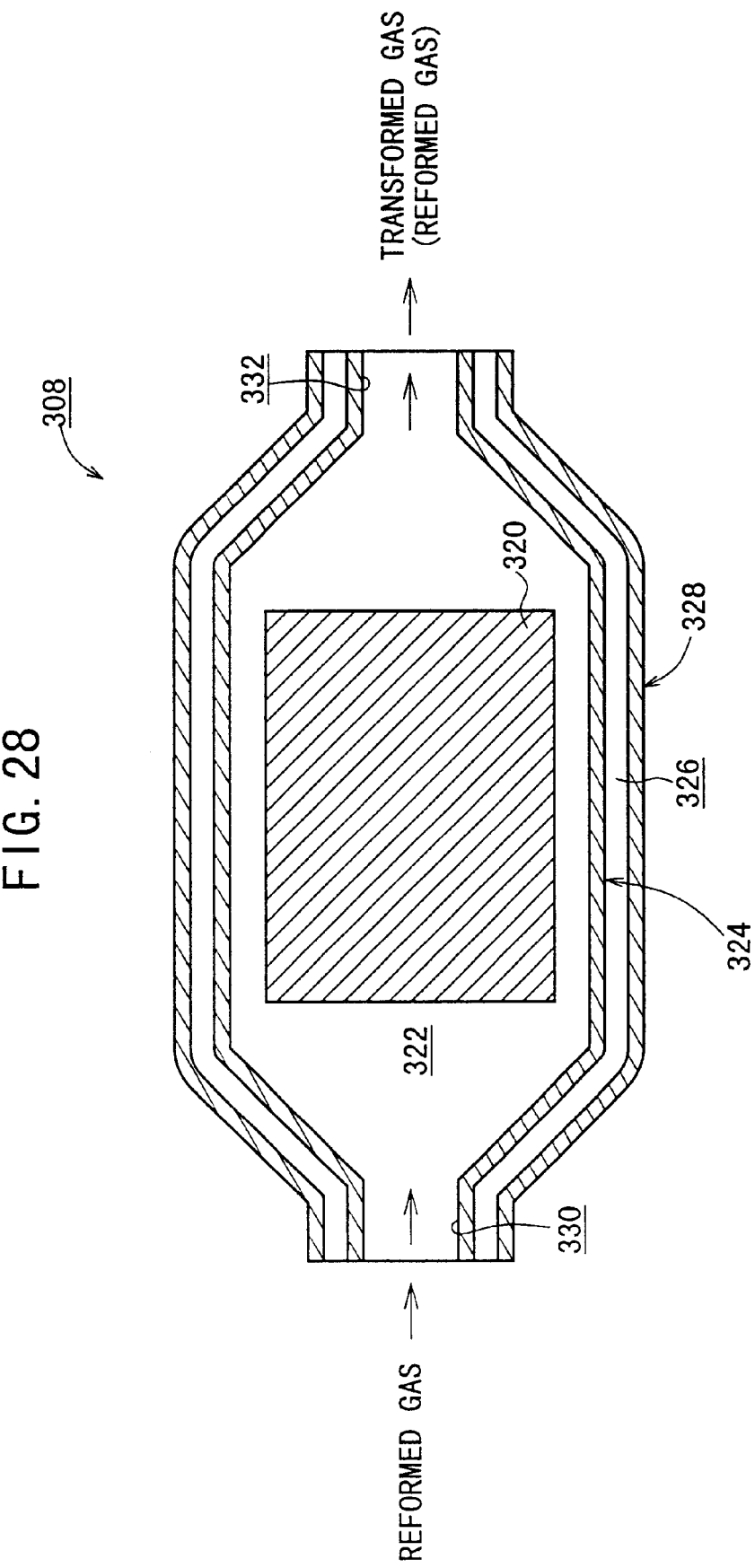
FIG. 28 shows a longitudinal sectional view illustrating a transformer for constructing the fuel-reforming apparatus.

As shown in FIG. 28, the transformer 308 is provided with an inner case 324 for forming a chamber 322 to arrange the catalyst 320, and an outer case 328 for forming a heat-insulating space 326 between the outer wall of the inner case 324 and the outer case 328. The inner case 324 includes a reformed gas inlet 330 and a reformed gas outlet 332, and it has its central portion which is designed to have a substantially cylindrical configuration with its increasing diameter. The outer case 328 surrounds the entire inner case 324, and it is designed to have a configuration similar to the inner case 324. The space 326 is provided to cover the whole chamber 322.

Accordingly, the transformer 308 is effective in that the heat consumption amount due to the heat release to the outside can be effectively reduced during the period in which the reformed gas introduced from the inlet 330 is subjected to the adjustment for the CO concentration by the aid of the catalyst 320, and it is fed from the outlet 332 to the CO eliminator 28.

Figure 29:
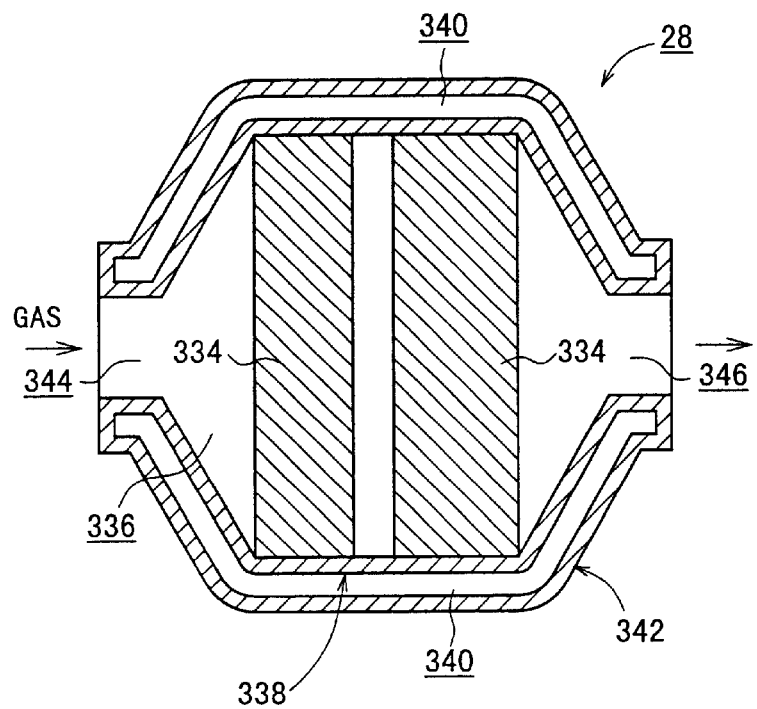
FIG. 29 shows a longitudinal sectional view illustrating a CO eliminator for constructing the fuel-reforming apparatus.

As shown in FIG. 29, the CO eliminator 28 is provided with an inner case 338 for forming a chamber 336 to arrange the catalyst 334, and an outer case 342 for forming a heat-insulating space 340 between the outer wall of the inner case 338 and the outer case 342. Both ends of the inner case 338 have the reduced diameter at which a gas inlet 344 and a gas outlet 346 are provided. The space 340, which surrounds the entire inner case 338 to cover the chamber 336, is formed in the outer case 340.

In the CO eliminator 28, the reformed gas, which has apassed through the transformer 308 and which has been transformed, is introduced from the gas inlet 344 into the chamber 336. Carbon monoxide is selectively oxidized and removed by the aid of the catalyst 334. After that, the gas is fed from the gas outlet 346 to the fuel cell stack 14. In this arrangement, the space 340 is provided to surround the entire chamber 336. The heat consumption amount of the reformed gas due to the heat release to the outside is effectively reduced in the chamber 336 in accordance with the heat-insulating action effected in the space 344. Further, it is possible to obtain a uniform temperature over the chamber 336.

Figure 30:
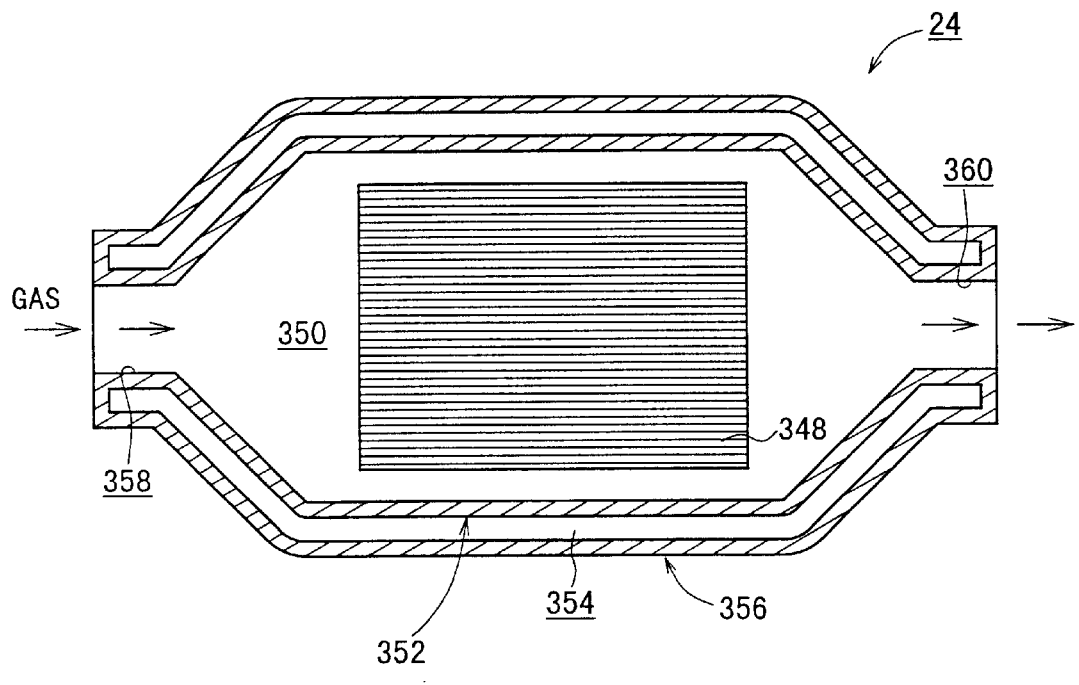
FIG. 30 shows a longitudinal sectional view illustrating a catalytic burner for constructing the fuel-reforming apparatus.

As shown in FIG. 30, the catalytic burner 24 is provided with an inner case 352 for forming a chamber 350 to accommodate the catalyst 348, and an outer case 356 for forming a heat-insulating space 354 between the outer wall of the inner case 352 and the outer case 356. Those provided at both ends of the inner case 352 are a gas inlet 358 for introducing the reformed gas fed from the CO eliminator 28 and the exhaust gas fed from the fuel cell stack 14, and a gas outlet 360 for discharging the combustion gas to feed the vaporization heat to the vaporizer 22. The outer case 356 is designed to have a shape similar to that of the inner case 352, and it forms the space 354 to cover the entire chamber 350.

In the catalytic burner 24 constructed as described above, the reformed gas and the exhaust gas introduced into the chamber 350 burn by the aid of the catalyst 348, and they are fed as the combustion gas to the vaporizer 22. In this arrangement, the space 354 is provided to cover the entire chamber 350. Thus, the heat consumption amount of the gas can be greatly reduced, and it is possible to facilitate the combustion performance owing to the heat-reserving effect and the heat-insulating effect in the chamber 350.

Figure 31:
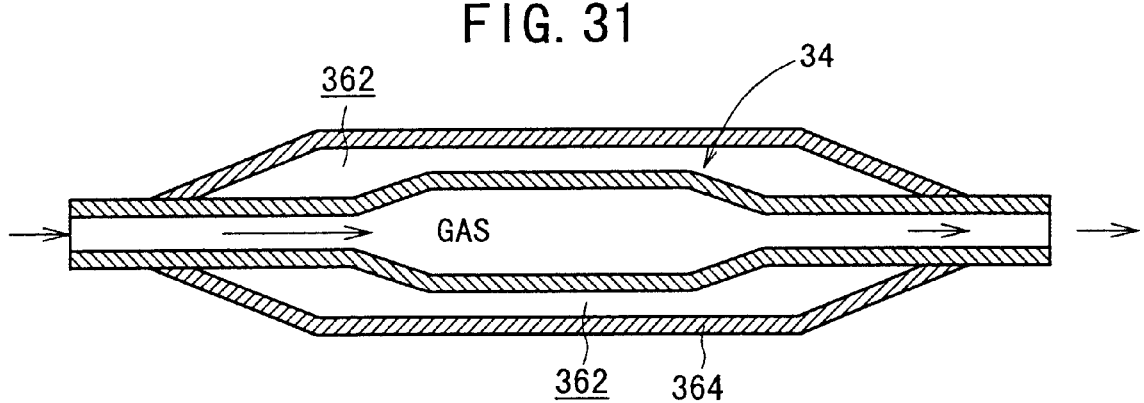
FIG. 31 shows a longitudinal sectional view illustrating a tube for constructing the fuel-reforming apparatus.

As shown in FIG. 31, the tube 34 is provided with an outer case 364 for forming a heat-insulating space 362 between the outer wall of the tube 34 and the outer case 364. Accordingly, the various gases flowing through the tube 34 is subjected to the effective reduction of the heat consumption amount, and they are fed to the respective processing sections while maintaining the desired temperature.

Figure 32:
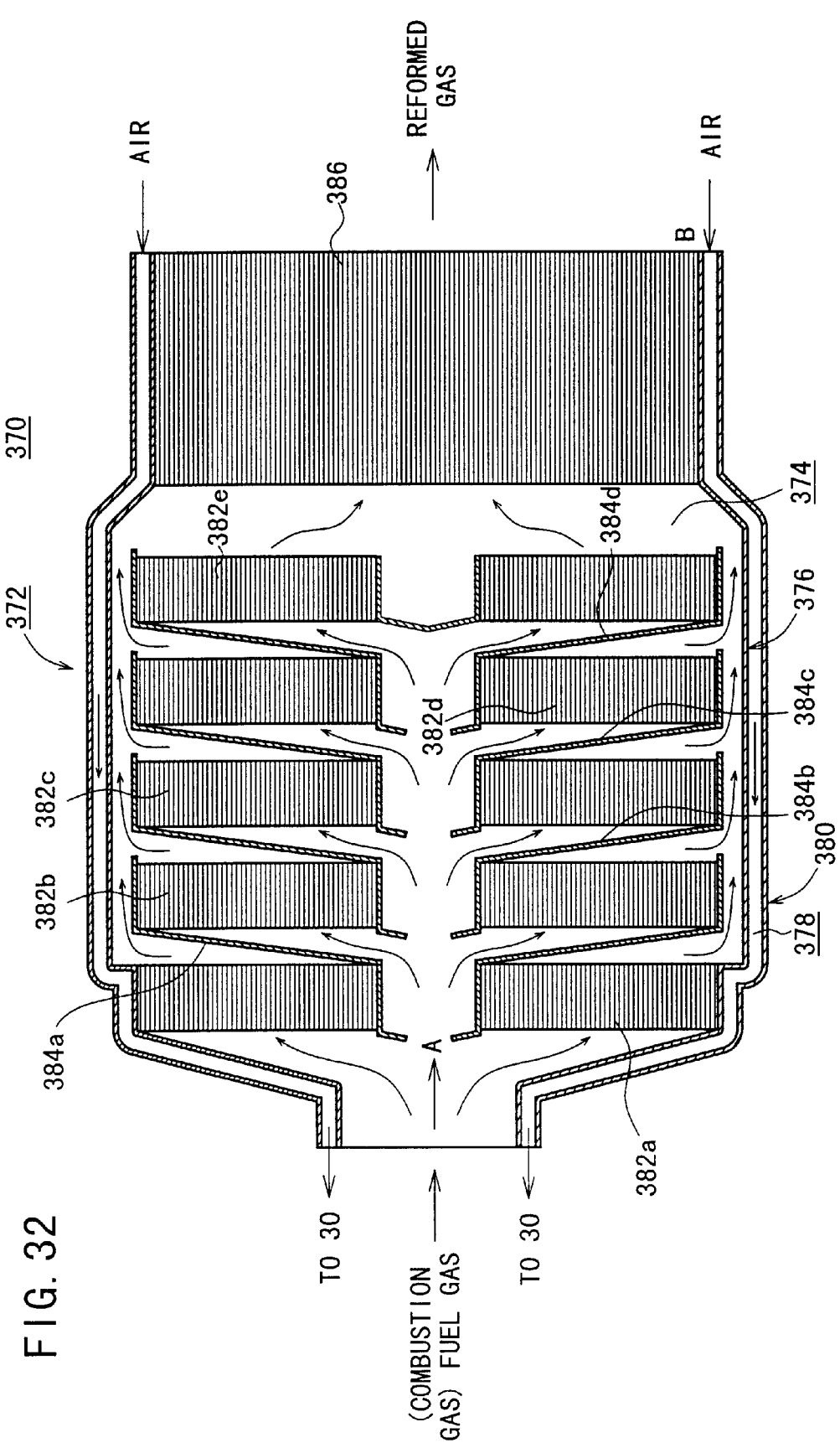
FIG. 32 shows a longitudinal sectional view illustrating principal parts of a reformer for constructing a fuel-reforming apparatus according to an eighth embodiment of the present invention.

FIG. 32 shows a longitudinal sectional view illustrating principal parts of a reformer 372 for constructing a fuel-reforming apparatus 370 according to the eighth embodiment of the present invention. The reformer 372 is provided with an inner case 376 for forming a reforming chamber 374, and an outer case 380 for forming a heat-insulating space 378 between the outer wall of the inner case 376 and the outer case 380.

First to fifth reforming catalyst layers (reforming catalyst sections) 382a, 382b, 382c, 382d, 382e are stacked in the reforming chamber 374 along the gas flow direction (direction indicated by the arrow A). Gas flow passage-forming means 384a, 384b, 384c, 384d are arranged between the first to fifth reforming catalyst layers 382a to 382e. A heat exchanger 386 is installed on the outlet side of the reforming chamber 374 to adjust the temperature of the reformed gas. Oxidizing air is supplied to the space 378 in a direction (direction indicated by the arrow B) opposite to the gas flow direction (direction indicated by the arrow A) in the reforming chamber 374. The oxidizing air is supplied to the space 378 by the aid of the air feeder 30, and then it is returned to the air feeder 30.

In the reformer 372 constructed as described above, when the combustion gas is supplied to the first to fifth reforming catalyst layers 382a to 382e arranged in the reformer 374, the air is introduced into the space 378 formed between the inner case 376 and the outer case 380.

Accordingly, it is possible to reduce the heat consumption amount which would be otherwise brought about due to the heat release to the outside of the combustion gas. Further, the air is preheated. Therefore, when the oxidizing air is introduced into the reforming chamber 374 together with the fuel gas and the steam, the air is preheated. Accordingly, an effect is obtained in that the temperature control process is executed easily and smoothly.

In the first to fifth reforming catalyst layers 382a to 382e, the outlet side temperature is higher than the inlet side temperature due to the oxidation reaction effected at the upstream stage of the catalyst layer. In view of this fact, when the air is allowed to flow in the direction opposite to the flow direction of the fuel gas, then the heat on the side of the fifth reforming catalyst layer 382e having a relatively high temperature is transferred toward the first reforming catalyst layer 382a, and thus the temperature in the reforming chamber 374 can be made uniform as a whole. Accordingly, the following effect is obtained. That is, the heat source is effectively utilized. Further, the desired reformed gas can be efficiently produced by using the first to fifth reforming catalyst layers 382a to 382e arranged and stacked as the multiple layers.

Figure 33:
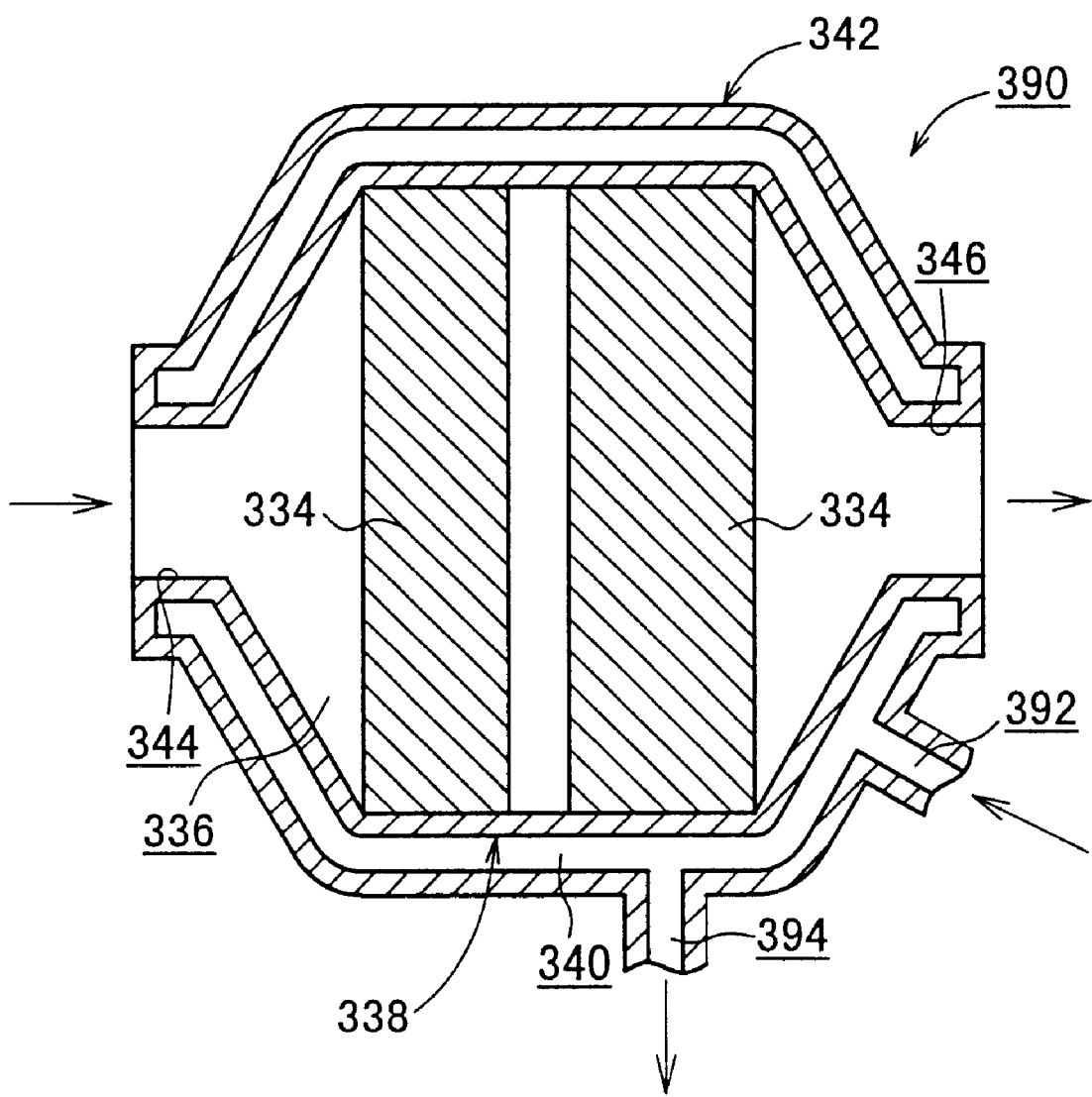
FIG. 33 shows a schematic longitudinal sectional view illustrating a CO eliminator for constructing a fuel-reforming apparatus according to a ninth embodiment of the present invention.
Figure 34:
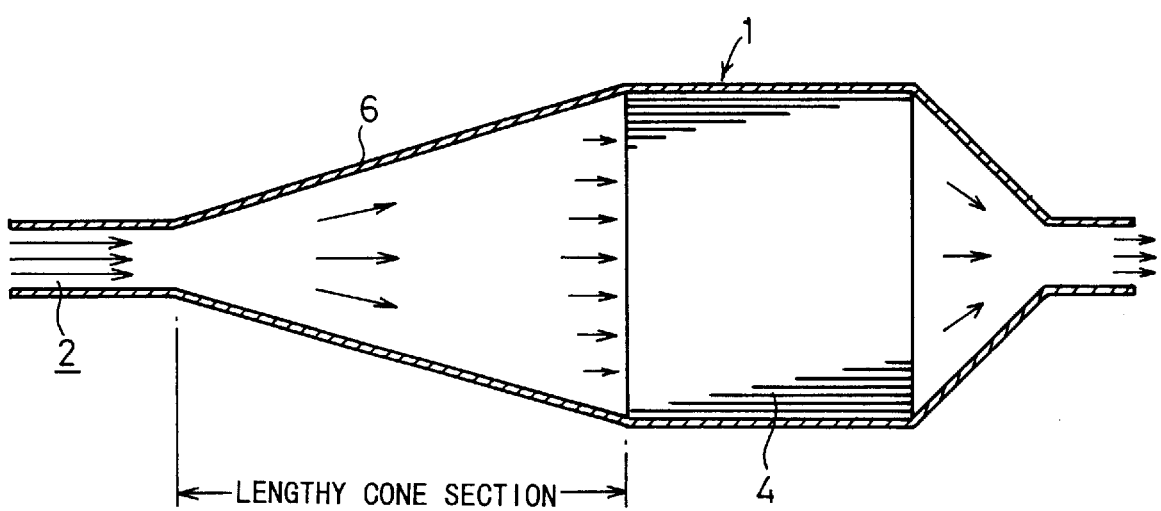
FIG. 34 illustrates a reformer concerning the conventional technique.

FIG. 33 shows a schematic longitudinal sectional view illustrating a CO eliminator 390 for constructing a fuel-reforming apparatus according to the ninth embodiment of the present invention. The same constitutive components as those of the CO eliminator 28 shown in FIG. 29 are designated by the same reference numerals, detailed explanation of which will be omitted.

The CO eliminator 390 includes an outer case 342 which is provided with an air-introducing port 392 and an air discharge port 394. The air-introducing port 392 is connected to a supply source of air (temperature control medium) capable of effecting the temperature control. Those usable as the air include, for example, the waste heat air discharged from the fuel cell stack 14, and the waste heat air discharged from the catalytic burner 24. For example, the temperature control is effected for the waste air by allowing the temperature-controllable medium to pass through.

Therefore, in the CO eliminator 390, the temperature-controlled waste heat air is supplied to the space 340. Accordingly, an effect is obtained in that the temperature in the chamber 336 can be controlled to be the desired temperature easily and correctly.

In the fuel-reforming apparatus according to the present invention, the oxidation reaction and the reforming reaction are simultaneously performed in the reforming catalyst section. The reforming catalyst section is designed to have the hollow plate-shaped configuration perpendicular to the gas flow direction in the reforming chamber. Accordingly, the arrangement of the entire apparatus is effectively simplified. The occurrence of stress concentration is avoided, and it is easy to contemplate the thin type apparatus. Accordingly, the reformed gas containing hydrogen can be efficiently produced by using the simple and compact arrangement.

In the fuel-reforming apparatus according to the present invention, the start-up combustion mechanism is arranged on the upstream side of the reforming catalyst section. The combustion gas to be used for heating is directly supplied to the reforming catalyst section upon the start-up. Thus, the warming-up time is greatly shortened, and it is possible to effectively obtain the reformed gas.

In the fuel-reforming apparatus according to the present invention, the flow-regulating plate is provided on the upstream side of the reforming catalyst section in the gas flow direction. The reformable fuel gas can be allowed to flow uniformly to the entire surface of the reforming catalyst section in accordance with the action of the flow-regulating plate. Accordingly, it is unnecessary to use the conventional lengthy cone section. The entire apparatus can be made compact. It is possible to apply the uniform load to all of the regions of the reforming catalyst section.

In the fuel-reforming apparatus according to the present invention, the reformable fuel gas is introduced from the plurality of introducing holes into the flow passage chamber communicating with the reforming chamber. Accordingly, the reformable fuel gas can be allowed to flow uniformly to the entire reforming catalyst section. Therefore, even when the reforming chamber is horizontally installed, it is possible to ensure the distribution performance of the reformable fuel gas.

In the fuel-reforming apparatus according to the present invention, the reaction rate of the reformable fuel gas is not less than 90% in the reforming catalyst section. The difference between the peak temperature at the inside and the gas outlet temperature is set to be within 100° C. Therefore, it is possible to increase the gas outlet temperature which is especially important for the reforming reaction. It is possible to obtain the uniform temperature for the entire reforming catalyst section. Further, the thickness of the reforming catalyst section is thin, and hence it is possible to greatly reduce the pressure loss. Furthermore, it is possible to decrease the amount of production of carbon monoxide which would be otherwise if caused due to the heat spot.

In the fuel-reforming apparatus according to the present invention, the peak temperature in the reforming catalyst section is detected, and the fuel-reforming apparatus is controlled on the basis of the peak temperature. Accordingly, the reforming catalyst section is prevented from thermal deterioration, and it can be used highly efficiently. Further, it is possible to reduce the necessary amount of the catalyst.

The fuel-reforming apparatus according to the present invention is provided with the inner case for forming the reforming chamber to arrange the reforming catalyst section, and the outer case for forming the heat-insulating space between the inner case and the outer case to surround the inner case. The temperature of the reforming catalyst section in the reforming chamber is reliably reserved in the heat-insulating manner in accordance with the heat-insulating action of the space. Further, the heat consumption amount of the reformed gas or the like can be reduced. The rigidity of the entire reformer is improved. It is possible to economically produce the reformer having the light weight.

In the fuel-reforming apparatus according to the present invention, the start-up combustion mechanism is provided with the fuel injection means for supplying the heating fuel to the combustion chamber, and the ignition plug for igniting the heating fuel. The combustion is performed in the combustion chamber to directly supply the combustion gas to the reforming catalyst section arranged in the reforming chamber communicating with the combustion chamber upon the start-up. Accordingly, the reforming catalyst section can be heated quickly with ease. The warming-up operation upon the start-up is performed in the short period of time all at once.

In the method for controlling the fuel-reforming apparatus according to the present invention, the heating medium is supplied to the reforming catalyst section to raise the temperature of the reforming catalyst section. The produced reformed gas is supplied to the burner to heat the vaporizer. The reformable fuel, the steam, and the oxygen are used to simultaneously perform the oxidation reaction and the reforming reaction. Subsequently, the carbon monoxide concentration in the reformed gas produced in the reforming catalyst section is detected. When the carbon monoxide concentration is not more than the predetermined value, the reformed gas is supplied to the fuel cell. Accordingly, the desired reformed gas can be obtained efficiently and reliably. Further, it is possible to effectively shorten the warming-up operation time upon the start-up.

In the fuel-reforming apparatus according to the present invention, the electric power is applied to the ignition plug arranged in the combustion chamber upon the start-up. After that, at the point of time at which it is 15. detected that the ignition plug arrives at the optimum temperature, the heating fuel is injected into the combustion chamber. On the other hand, at the point of time at which it is detected that the interior of the combustion chamber arrives at the predetermined temperature, the electric power application to the ignition plug is stopped.

Therefore, the reliability of the ignition is ensured in the combustion chamber. Further, it is possible to effectively improve the durability of the ignition plug.

In the fuel-reforming apparatus according to the present invention, the carbon monoxide concentration or the residual hydrocarbon concentration is estimated on the basis of the reformed gas outlet temperature of the reforming catalyst section arranged in the reforming chamber and the supply amount of the reformable fuel introduced into the reforming chamber. Accordingly, it is unnecessary to use the various sensors. The simple and economic system can be used to reliably estimate the component in the reformed gas so that the desired reformed gas is obtained.

What is claimed is:

1. A fuel-reforming apparatus for producing reformed gas containing hydrogen by reforming reformable fuel containing hydrocarbon, said fuel-reforming apparatus comprising:
   a plate-shaped reforming catalyst section with a central hole arranged in a reforming chamber; and
   a supply mechanism for supplying a gas including said reformable fuel, steam, and oxygen to said reforming chamber in a direction perpendicular to surfaces of said reforming catalyst section to simultaneously perform an oxidation reaction and a reforming reaction in said reforming catalyst section,
   wherein said gas flows into one of said surfaces of said reforming catalyst section, and flows out of another of said surfaces of said reforming catalyst section.

2. The fuel-reforming apparatus according to claim 1, further comprising a flow passage member for forming a gas supply flow passage having a conical configuration with its diameter increasing toward said reforming catalyst section.

3. The fuel-reforming apparatus according to claim 1, wherein a plurality of reforming catalyst sections as defined above are aligned in said gas flow direction, and a gas flow passage-forming means is arranged between said reforming catalyst sections to make a pathway which passes through one of said reforming catalyst sections and which detours the other reforming catalyst sections.

4. The fuel-reforming apparatus according to claim 3, further comprising a flow passage member for forming a gas supply flow passage having a conical configuration with its diameter increasing toward said reforming catalyst section.

5. The fuel-reforming apparatus according to claim 1, wherein a conical cover member is installed to said central hole of said reforming catalyst section arranged at the most downstream side in said gas flow direction.

6. The fuel-reforming apparatus according to claim 1, wherein said reforming chamber has a horizontal structure for supplying said reformable fuel gas in a horizontal direction toward said reforming catalyst section.

7. The fuel-reforming apparatus according to claim 1 further comprising:
   a reformer provided with said reforming chamber for arranging said reforming catalyst section therein, wherein said reformer includes:
   an inner case for forming said reforming chamber; and
   an outer case for surrounding said inner case while forming a heat-insulating space between an outer wall of said inner case and said outer case.

8. A fuel-reforming apparatus for producing reformed gas containing hydrogen by reforming reformable fuel containing hydrocarbon, said fuel-reforming apparatus comprising:
   a plate-shaped reforming catalyst section with a central hole arranged in a it reforming chamber;
   a supply mechanism for supplying a gas including said reformable fuel, steam, and oxygen to said reforming chamber in a direction perpendicular to surfaces of said reforming catalyst section to simultaneously perform an oxidation reaction and a reforming reaction in said reforming catalyst section; and
   a start-up combustion mechanism arranged on an upstream side of said reforming catalyst section, for effecting combustion in a combustion chamber communicating with said reforming chamber to directly supply warming combustion gas to said reforming catalyst section upon start-up,
   wherein said gas flows into one of said surfaces of said reforming catalyst section, and flows out of another of said surfaces of said reforming catalyst section.

9. The fuel-reforming apparatus according to claim 8, wherein said reforming chamber has a horizontal structure for supplying said reformable fuel gas in a horizontal direction toward said reforming catalyst section.

10. The fuel-reforming apparatus according to claim 8 further comprising:
    a reformer provided with said reforming chamber for arranging said reforming catalyst section therein, wherein said reformer includes:
    an inner case for forming said reforming chamber; and
    an outer case for surrounding said inner case while forming a heat-insulating space between an outer wall of said inner case and said outer case.

* * * * *